(12) United States Patent
Ou

(10) Patent No.: US 7,769,032 B1
(45) Date of Patent: Aug. 3, 2010

(54) TOPOLOGY SPLIT MANAGER USING GRAPH CONTRACTION

(75) Inventor: Chou-Wei Ou, Poughkeepsie, NY (US)

(73) Assignee: EMC Corporation, Hopkinton, MA (US)

( * ) Notice: Subject to any disclaimer, the term of this patent is extended or adjusted under 35 U.S.C. 154(b) by 432 days.

(21) Appl. No.: 11/821,008

(22) Filed: Jun. 21, 2007

(51) Int. Cl.
*H04L 12/28* (2006.01)
*H04L 12/56* (2006.01)
(52) U.S. Cl. ..................... 370/401; 709/223
(58) Field of Classification Search ............ None
See application file for complete search history.

(56) References Cited

U.S. PATENT DOCUMENTS

| | | | | |
|---|---|---|---|---|
| 5,926,632 | A * | 7/1999 | Kawaguchi ............ | 716/7 |
| 6,437,804 | B1 * | 8/2002 | Ibe et al. .............. | 715/736 |
| 7,010,789 | B1 * | 3/2006 | Kimelman et al. ...... | 718/100 |

OTHER PUBLICATIONS

U.S. Appl. No. 11/052,395, Shai Benjamin.

* cited by examiner

*Primary Examiner*—Chirag G Shah
*Assistant Examiner*—Minh-Trang Nguyen
(74) *Attorney, Agent, or Firm*—Krishnendu Gupta; Jason A. Reyes

(57) ABSTRACT

A method, apparatus and computer product for assigning elements of a network into a plurality of domains is disclosed. The method comprises the steps of determining a weight for each of said network elements, creating at least one of said plurality of domains by assigning each of said network elements having a weight no greater than a desired weight threshold with a highest weighted neighboring network element wherein the weight of said network elements and the highest weight neighboring network element is no greater than a desired threshold value, and iteratively increasing the desired weight threshold and repeating the assignment of network elements to at least one of said plurality of domains until a desired number of domains having an accumulated weight less than the desired threshold value has been obtained. The method further identifies each of the network elements assigned to the domains providing communications between said domains.

27 Claims, 25 Drawing Sheets

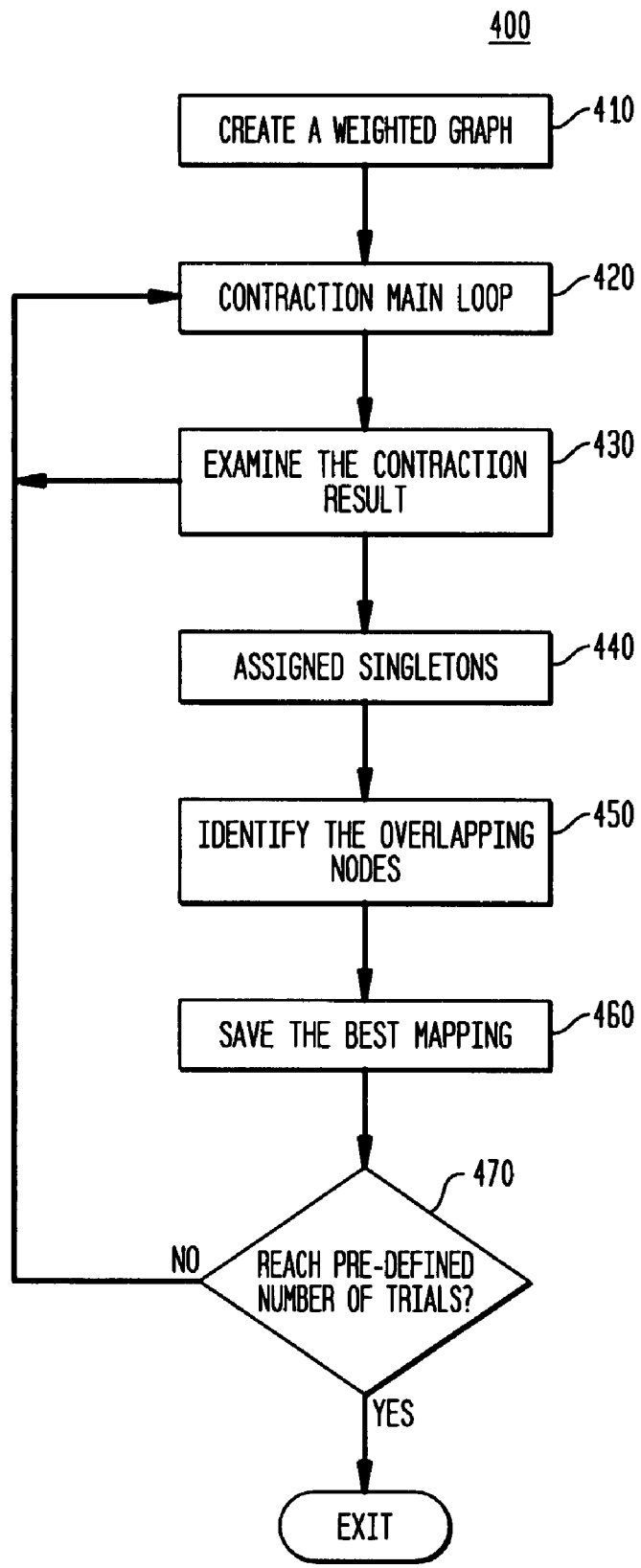

TOPOLOGY SPLIT MANAGER USING GRAPH CONTRACTION

FIELD OF THE INVENTION

The present invention relates generally to networks and distributed systems and more particularly, to methods and apparatus for organizing distributing system components for analyzing and managing the distributed system.

BACKGROUND OF THE INVENTION

A management system is typically used to manage (e.g., monitor and control) the operation of ever increasing networked systems and networks of networked systems. A distributed system (e.g., a computer or communication system) generally includes many individual components (e.g., nodes or devices), which may be implemented using both hardware and software elements. The individual devices, and the relationships between them, conventionally define the "topology" of a distributed system.

A management system typically includes a plurality of agents that are assigned to a centralized manager. The agents of the management system are used to monitor, control, and otherwise influence the behavior of the devices or elements of the managed distributed system. These agents may be any suitable software or hardware element that is capable of collecting information, e.g., statistics, about the behavior of a device and/or enacting required changes to the device. Moreover, any number of the components in a distributed system may be associated with one or more agents, although each component for which monitoring and/or control is desired must be associated with at least one agent.

A centralized manager is used to coordinate the operation of the agents in the management system. As is the case with agents, the centralized manager may be any suitable software or hardware element, although it must be capable of performing tasks required (or useful) to monitor or control a distributed system, such as analysis (performance or fault), configuration changes, etc. In many types of management systems, the agents run on or in the same network of the respective network devices they are monitoring and/or controlling while the manager remotely collects information from one or more agents to perform its task as a whole.

It is important to note that the agents are not required to be on the same network as the managed device or on the device itself. The distinction between the manager and the agent is in their functionality (e.g., monitoring, control, or analysis) rather than their location relative to the devices.

A limitation on the performance of management systems has traditionally been size of the network or the system being managed. Large systems, that have components or elements distributed over a wide geographic area, can present an unsustainable computational burden on the management system. One approach often used to alleviate the burden on the management system of a distributed system, and to thus improve scalability, is to create a distributed-architecture management system. In a distributed-architecture management system, a single, centralized, manager is replaced by a plurality of managers, each of which oversees a subset of the agents in the distributed network or system. Each manager is associated with a respective partition or subset of the distributed architecture management system.

Many current solutions use ad-hoc methods, typically involving manual configuration of the management system. Such methods, however, suffer from several drawbacks. For example, the resulting division may not provide an accurate result as each manager needs to have enough information to be able to correlate events in the associated devices managed as well as causally-related devices it may not be managing. For example, a failure of a link may go undetected if the two devices adjacent to the links are assigned to different managers. Secondly, the process is inefficient. In the case of very large networks, with thousands of devices, it is time consuming to assign devices to managers in order to accomplish preset goals. For example, if one wants to minimize the number of devices that need to be assigned to more than one manager, it may be difficult to develop an efficient algorithm to perform an efficient assignment for very large networks. Lastly, the process is not scalable as it is difficult to develop an algorithm that can accomplish preset goals while being scalable in the number of agents.

One solution proposed to overcome the above noted problems is presented in U.S. patent application Ser. No. 11/052,395, entitled "Method and Apparatus for Arranging Distributed System Topology Among a Plurality of Network Managers," filed on Feb. 7, 2005, the contents of which are incorporated by reference, as if in full, herein. In this proposed solution, network elements or components or agents are assigned to at least one manager and the assignment is iteratively improved until at least one desired criterion regarding the at least one manager is substantially achieved. The improvement upon the assignment is made using a modified Kernighan-Lin algorithm applied to hyper-graphs and multi-partitions.

However, there are situations wherein the proposed modified Kernighan-Lin algorithm may not converge upon a desired solution or may require an excessive amount to time to complete. The former can occur when the initial reference points are not within a region of solutions that fail to converge and the latter may occur when the number of elements, nodes or agents is large.

In view of the foregoing, it would be desirable to provide a fast and reliable method of assigning agents to one or more managers in a distributed-architecture manager system.

SUMMARY OF THE INVENTION

A method, apparatus and computer product for assigning elements of a network into a plurality of domains is disclosed. The method comprises the steps of determining a weight for each of said network elements, creating at least one of said plurality of domains by assigning each of said network elements having a weight no greater than a desired weight threshold with a highest weighted neighboring network element wherein the weight of said network elements and the highest weight neighboring network element is no greater than a desired threshold value, and iteratively increasing the desired weight threshold and repeating the assignment of network elements to at least one of said plurality of domains until a desired number of domains having an accumulated weight less than the desired threshold value has been obtained. The method further identifies each of the network elements assigned to the domains providing communications between said domains.

DETAILED DESCRIPTION OF THE FIGURES

FIG. 4 illustrates a flow chart of exemplary network topology splitting process in accordance with the principles of the invention;

Figure 7A:
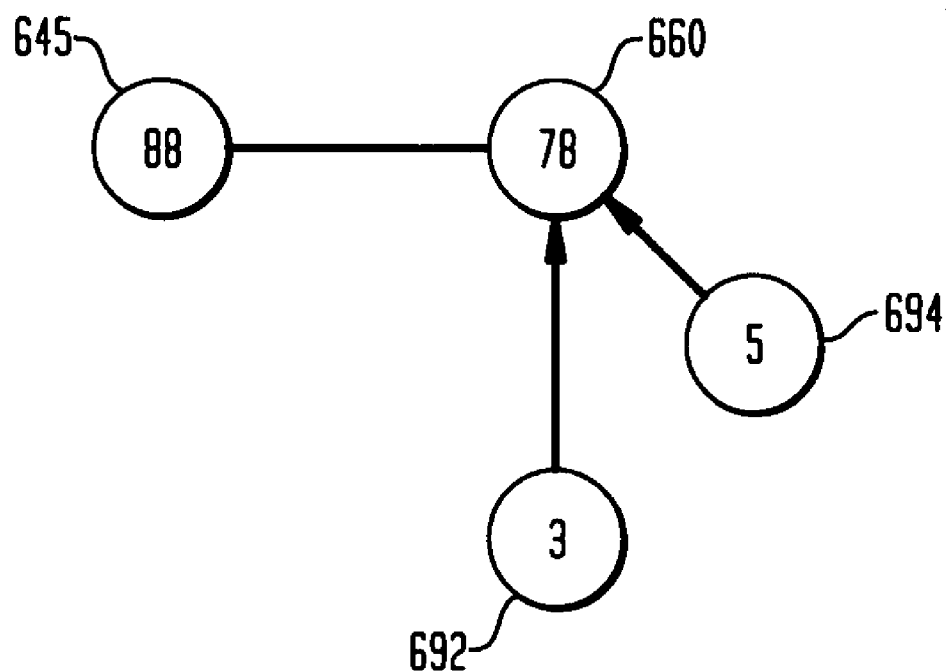
Figure 7B:
Figure 8:
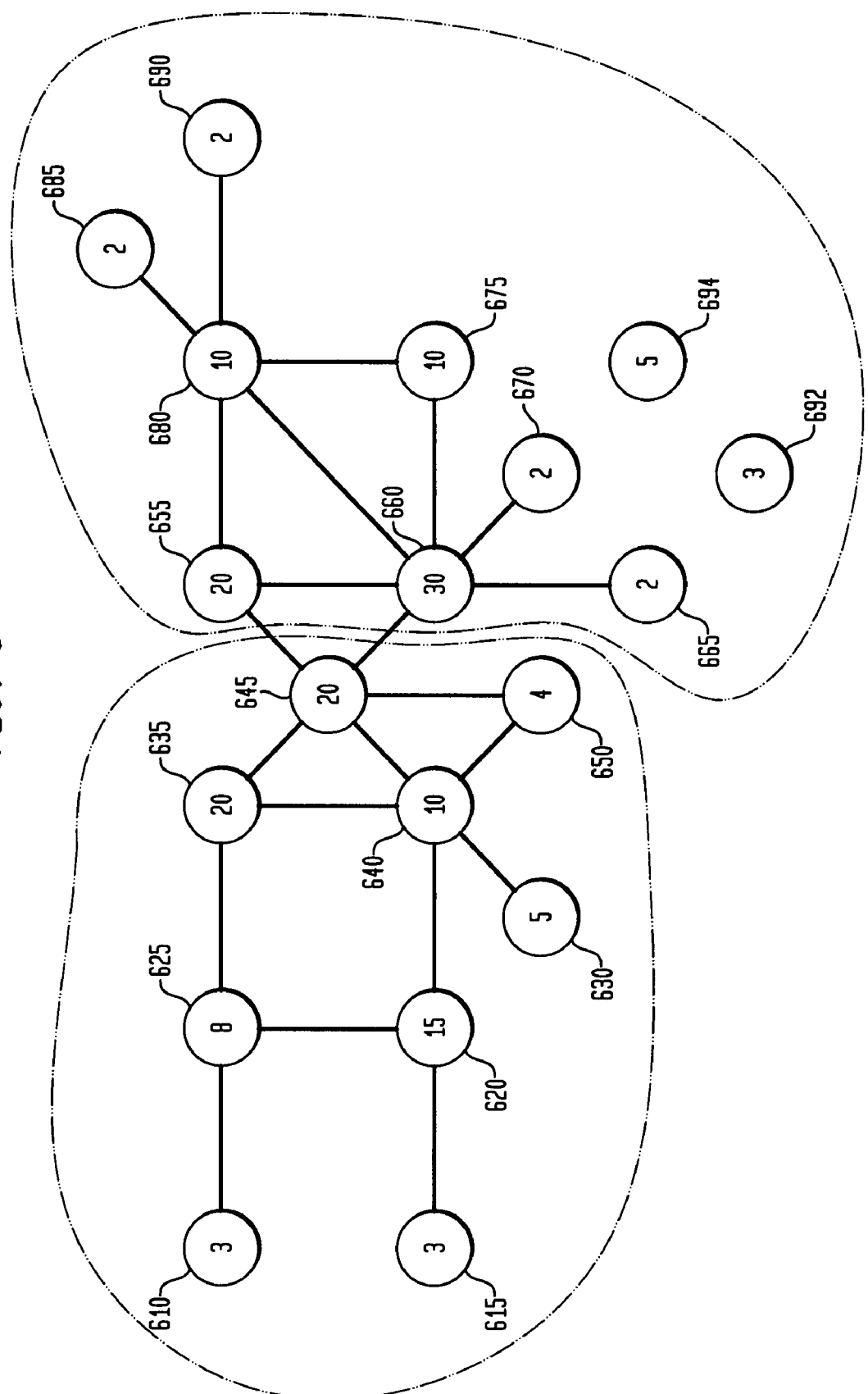
Figure 9:
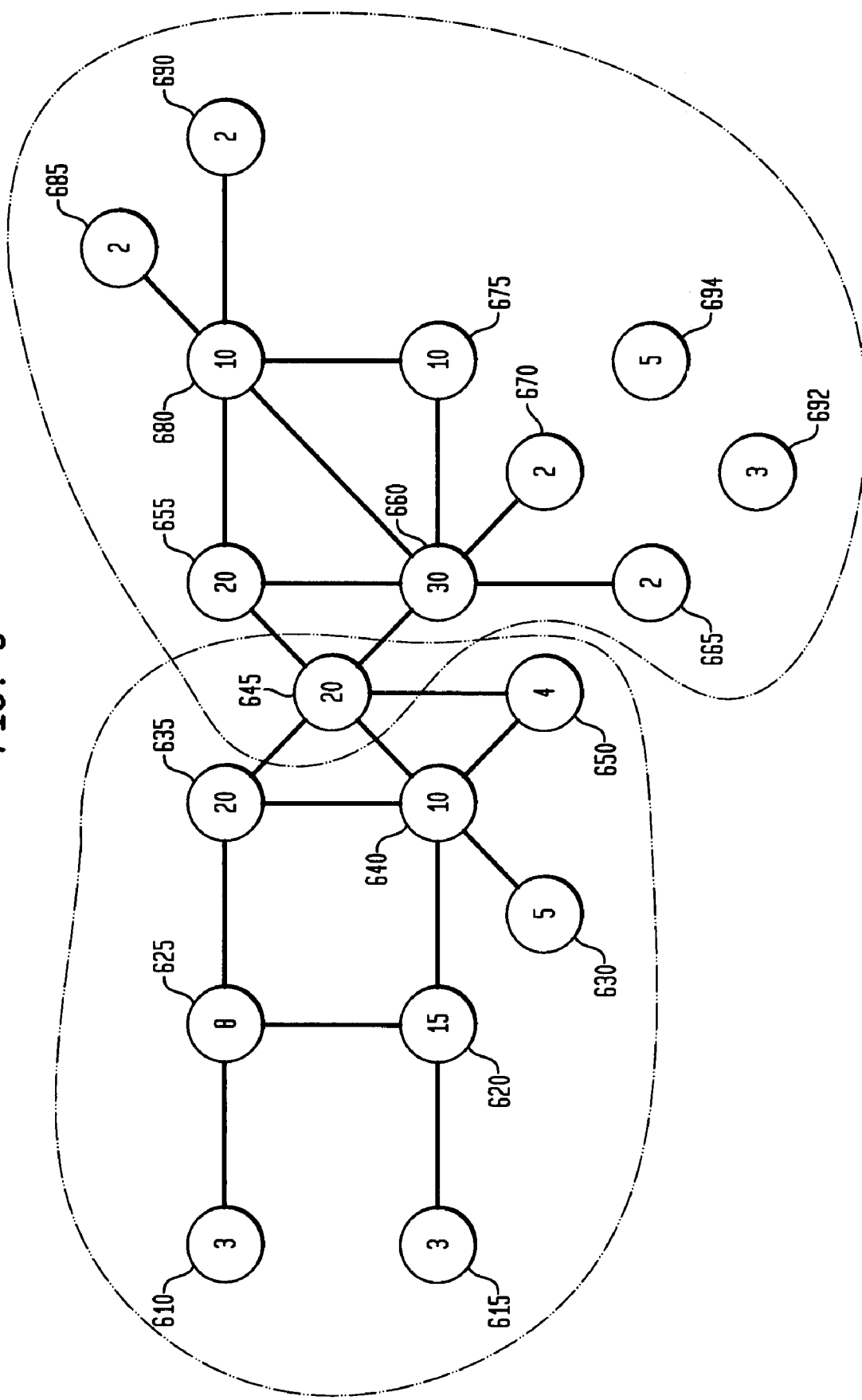
Figure 10:
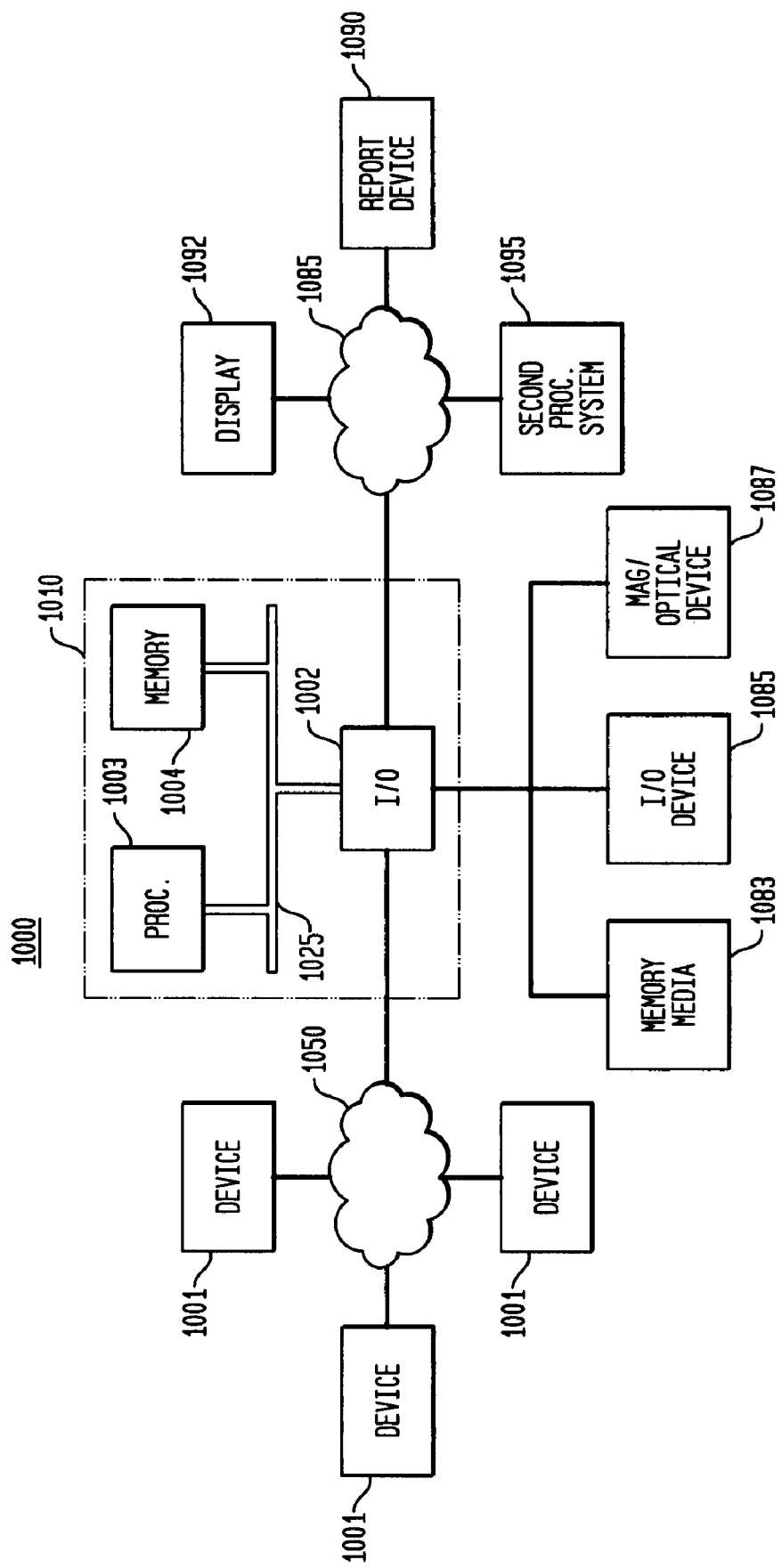

FIGS. 7A-7B graphically illustrates Assign Singleton step 440, shown in FIG. 4;

FIG. 8 graphically illustrates step of mapping of the domains in accordance with the principles of the invention;

FIG. 9 graphically illustrates Identification of Overlapping Nodes step 450 shown in FIG. 4; and FIG. 10 illustrates a system implementing the processing shown herein.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

DETAILED DESCRIPTION

Figure 1:
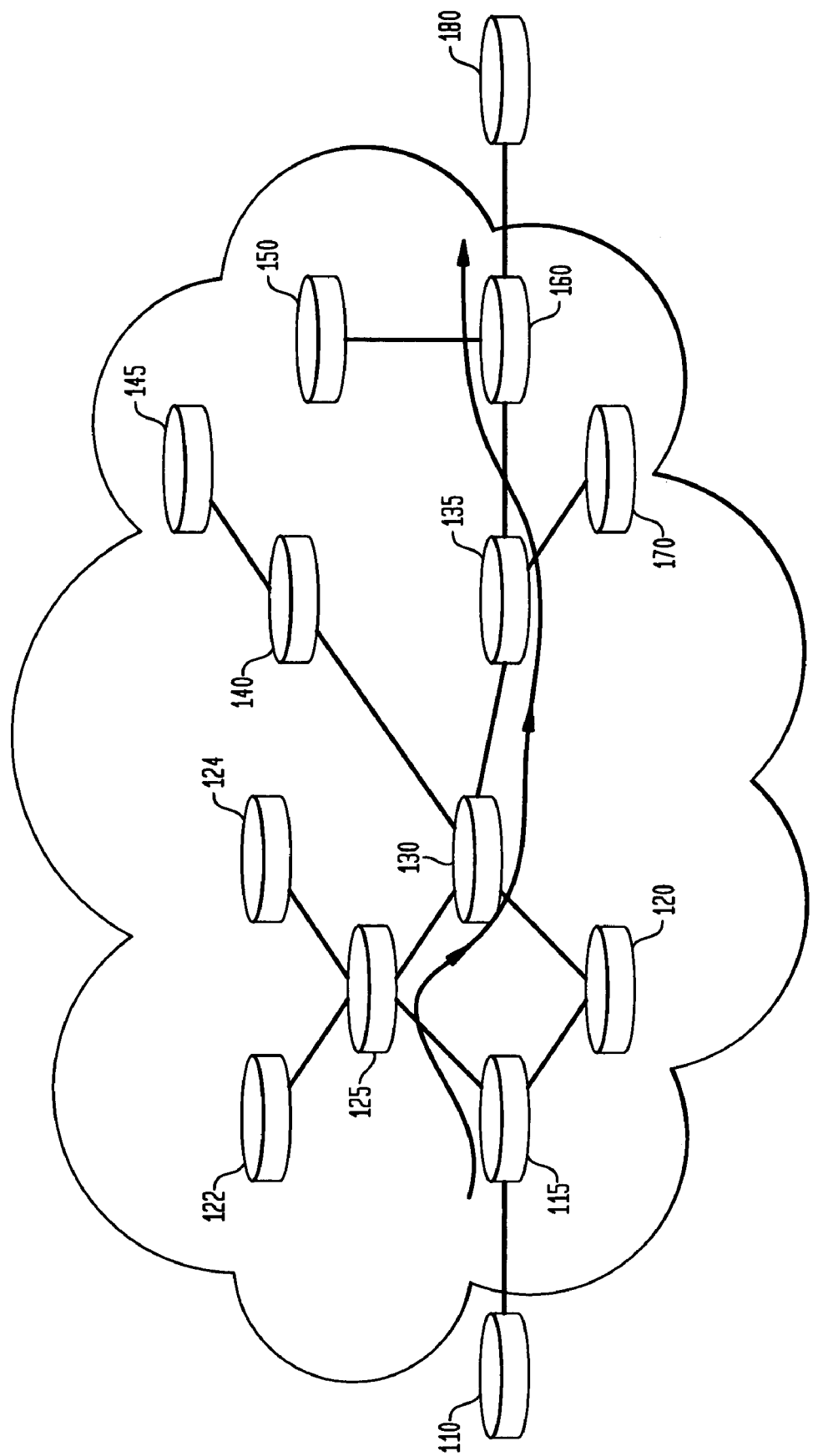
FIG. 1 illustrates a conventional network or distributed system.

FIG. 1 illustrates an exemplary network or distributed system, wherein, network 100 is composed of Edge Routers (ER) 110 and 180 and Routers 115-170. As shown, each router contains three ports for transmitting and/or receiving data or information items from connected routers. For example, router 115 is shown to receive data from ER 110 on its port 3 and transmit data to router 125 and to router 130. Although router 115 is discussed and shown with regard to a unidirectional transmission, it would be recognized that the routers and the links between routers may be configured for bi-direction transmission and reception.

The internal routers, in this case, 120-170, represent the core network nodes and contain forwarding tables that map the incoming information to an outgoing port. The incoming port is the identifier of the network interface at which the packet arrived while the outgoing port is the identifier of the network interface through which the packet will proceed to the next node. The routers base their forwarding decisions on the address of the user. Edge Router 180, provides received information to the intended user (not shown).

As the number of nodes in the network increases the ability to manage the overall characteristics of the network increases. Thus, the need to assign nodes into super-nodes or domains provides for the individual management of each of the domains and the subsequent correlation of the data from each of the nodes to determine an overall characteristic of the distributed system.

Figure 2:
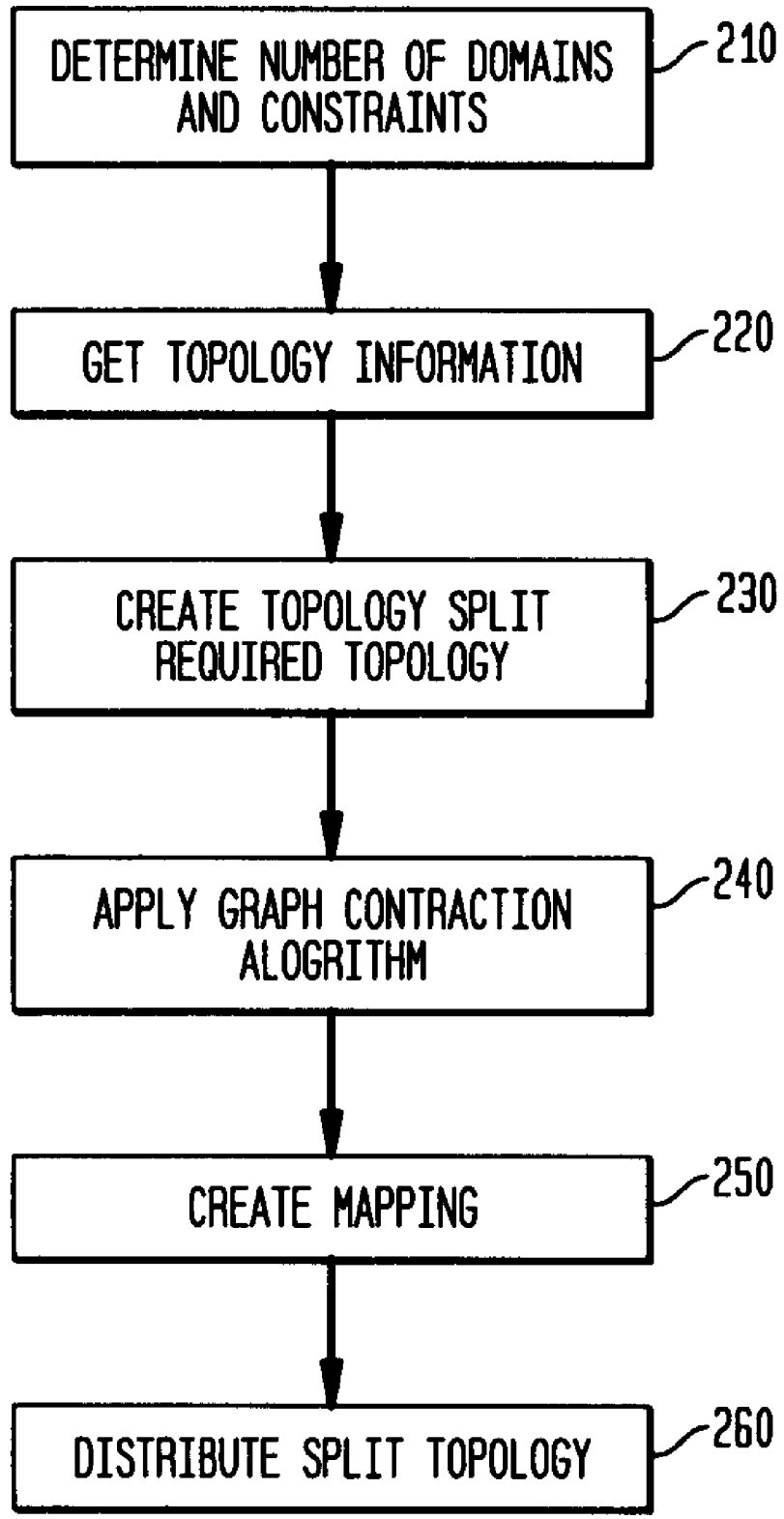
FIG. 2 illustrates a flow chart of an exemplary process for splitting a network topology in accordance with the principles of the invention.

FIG. 2 illustrates a flow chart of an exemplary process for splitting the topology of a distributed system in accordance with the principles of the invention. In this exemplary process a determination of the number of domains and the constraints imposed upon the domains is provided or obtained in step 210. For example, the number of domains may be provided by a user based on an input provided. The number of domains may be chosen small to accommodate a large number of elements, nodes, or agents in each domain or may be chosen large to include a small number of elements, nodes or agents. In addition, the input number of domains may represent an initial number of desired domains, but may be adjusted to accommodate the total number of elements in the network or distributed system in relation to desired characteristics of each domain. A constraint imposed upon a domain may, for example, be a total weight of elements that may be contained within a selected domain. The weight and weighting process is more fully described with regard to FIGS. 4 and 5A. In this illustrated example, each of the nodes possesses a weight of one (1).

At step 220, information regarding the network topology is obtained. At step 230, the topology is initially split into the provided number of domains and at step 240 a graph contraction algorithm is applied to the split topology. At step 250 a map is created and at step 260 the determined split topology is distributed to be used by other processes and/or displayed to a user. Detailed processing associated with steps 230-250 is described with regard to FIG. 4.

Figure 3A:
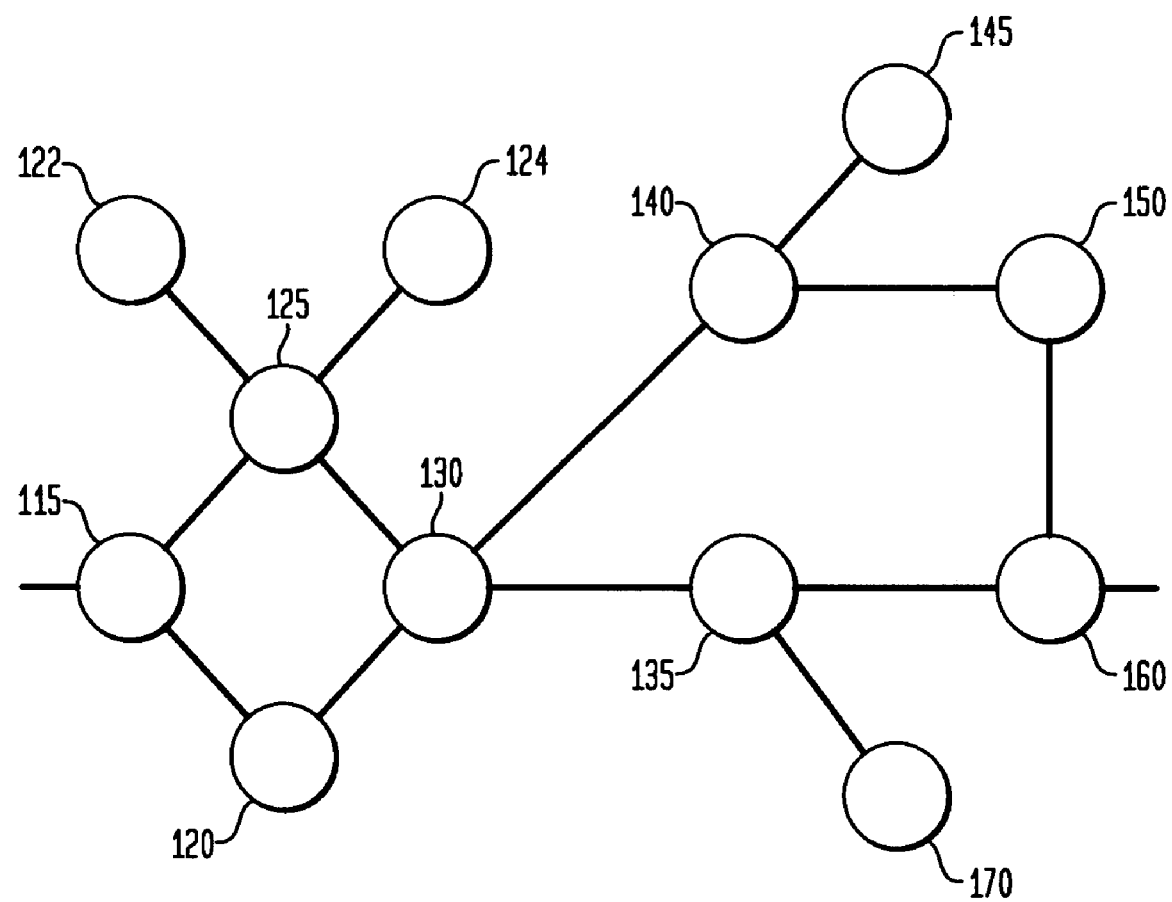
FIGS. 3A-3D illustrates an example of a progressive topology split using graph contraction in accordance with the principles of the invention.
Figure 3B:
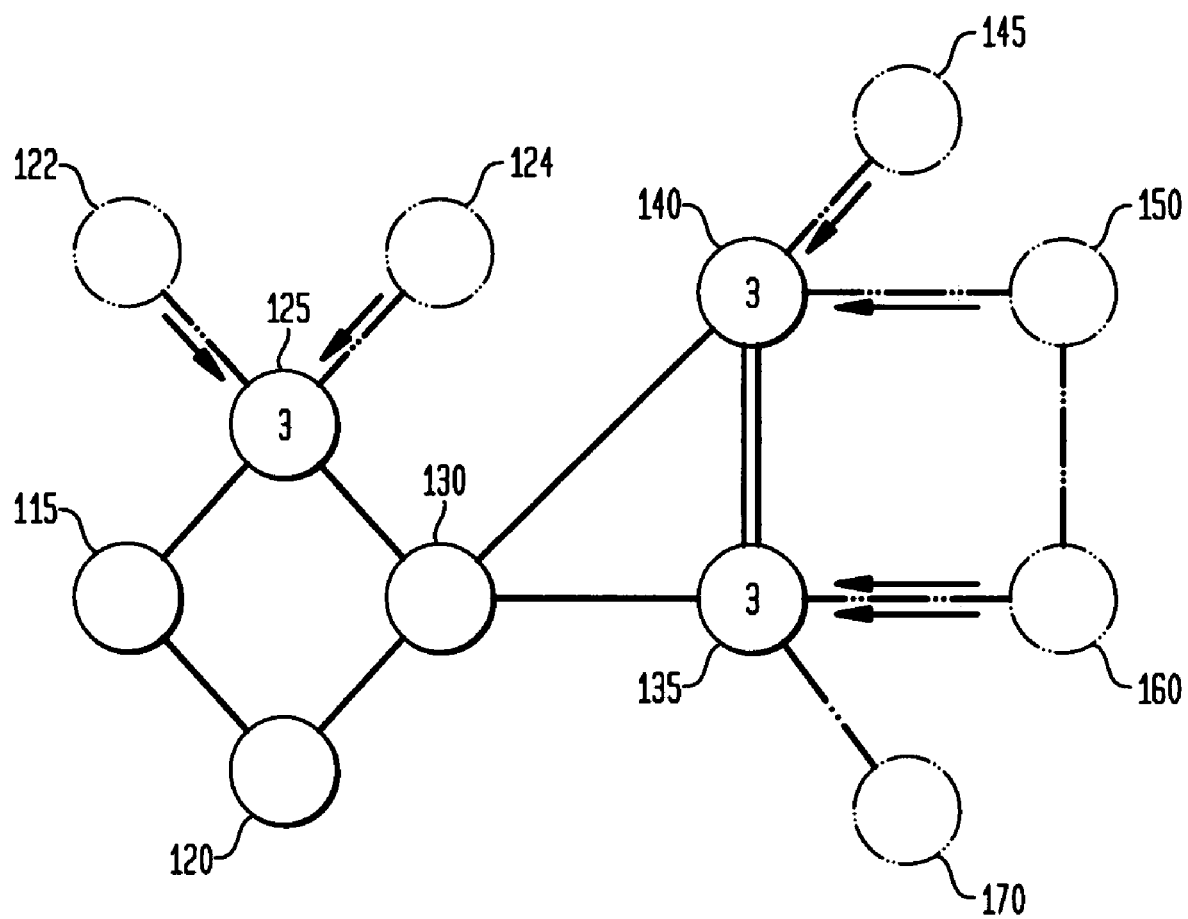

FIGS. 3A-3D collectively illustrate the process of topology splitting using graph concatenation of the core network shown in FIG. 1 in accordance with the principles of the invention. FIG. 3A represents the components or elements 115-170 of the core network. Each element is assigned a weight factor. In this illustrative case, the weight factor assigned each node has a value of one (1). Referring to FIG. 3B, nodes 122 and 124 are concatenated into, or assigned to, node 125 causing node 125 to have a weight of 3. Similarly nodes 145 and 150 are concatenated into node 140 and nodes 160 and 170 are concatenated into node 135. Each of nodes 135 and 40 has a weight value of 3.

Figure 3C:
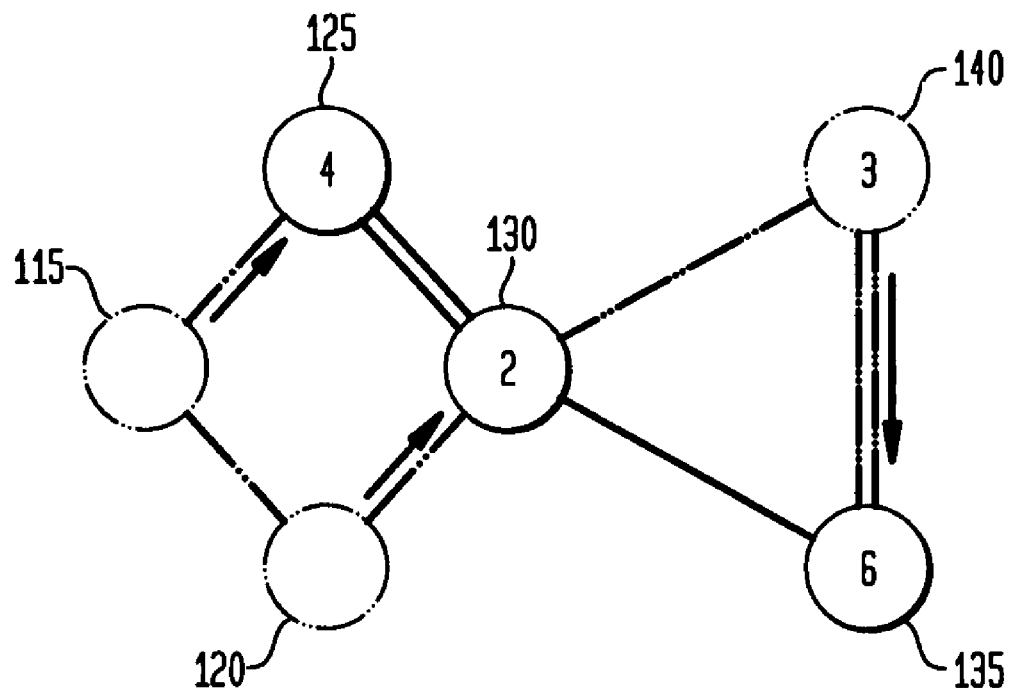
Figure 3D:
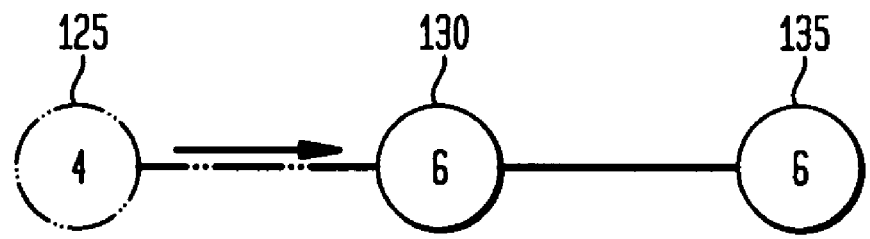

FIG. 3C illustrates a second concatenation step wherein node 115 is merged into node 125, node 120 is merged into node 130 and node 140 is merged into node 135. The resultant merged super-nodes have weight factors 4, 2 and 6, respectively. FIG. 3D illustrates the concatenation of node 125 into node 130 resulting in a weight factor of 6 for node 130. In this illustrative example, the two super-nodes or domains 130 and 135 may represent the core network elements and the elements within each node may be managed and independently analyzed to determine, for example, status of the core network.

FIG. 4 illustrates, in more detail, the processing associated with graph contraction in accordance with the principles of the invention. In accordance, a weight graph is determined or created at block 410. At block 420, graph contraction is performed on the weighted graph. At block 430, the results of the contraction are examined and a determination is made whether the results satisfy the desired criterion. At block 440, unassigned nodes (singletons) are assigned and at block 450 overlapping nodes are identified. At block 460, the best mapping is saved and at block 470 a determination is made whether a pre-defined number of attempts at graph contraction have been made. If the answer is positive than the process exits with the best mapping saved.

Figure 5A:
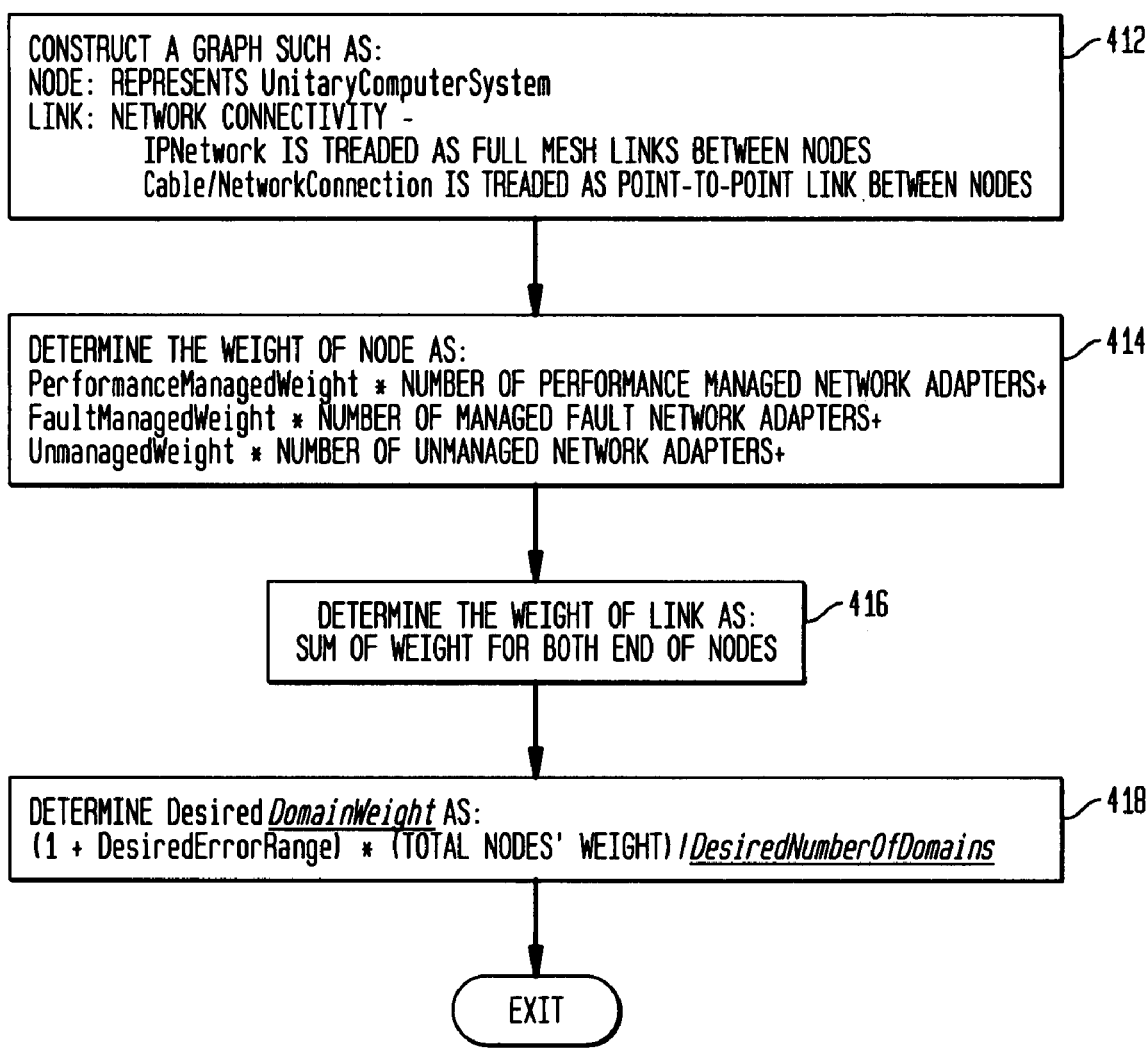
FIGS. 5A-5F illustrates flow charts of the processes illustrated in FIG. 4.

FIG. 5A illustrates a flowchart of an exemplary process for assigning weights to nodes in accordance with step 410 of FIG. 4. In this illustrated process, at block 412, a determination is made regarding the type of network being processed. For example, an IP network is treated as a full-mesh network whereas a cable network is treated as a point-to-point network. Full-mesh and point-to-point networks are well-known in the art and need not be discussed in detail herein.

At block 414, a weight is determined for each node in the network. The weight is determined based on factors such as number of managed network adapters (ports), number of fault network adapters and number of unmanaged network adapters as:

$$weight = w_1 * n_{pmna} + w_2 * n_{mfna} + w_3 * n_{una}$$

where performance managed network adapters are adapters that are managed based on defined polices. For example, all connected network adapters with maximum speed >=100 MB per second;

fault network adapters are adapters that are managed based on predefined policies to ensure the accuracy of root cause analysis; and unmanaged network adapters are adapters that those that do not fit into the above categories but will be included in the network anyway.

At block 416, a weight of a link between two nodes is also determined. A link weight is determined as the sum of the connected node's weight. At block 418 a desired overall weight of nodes (Domainweight) is determined as:

Domainweight=(1+Desired Error Range)*(Total node's weight)/(Desired number of domains).

where

Desired Error Range is the expected or accepted upper bound of the largest domain weight that can be exceeded compared to:

average domain weight-(Total node weight)/(desired number of domains).

Figure 5B:
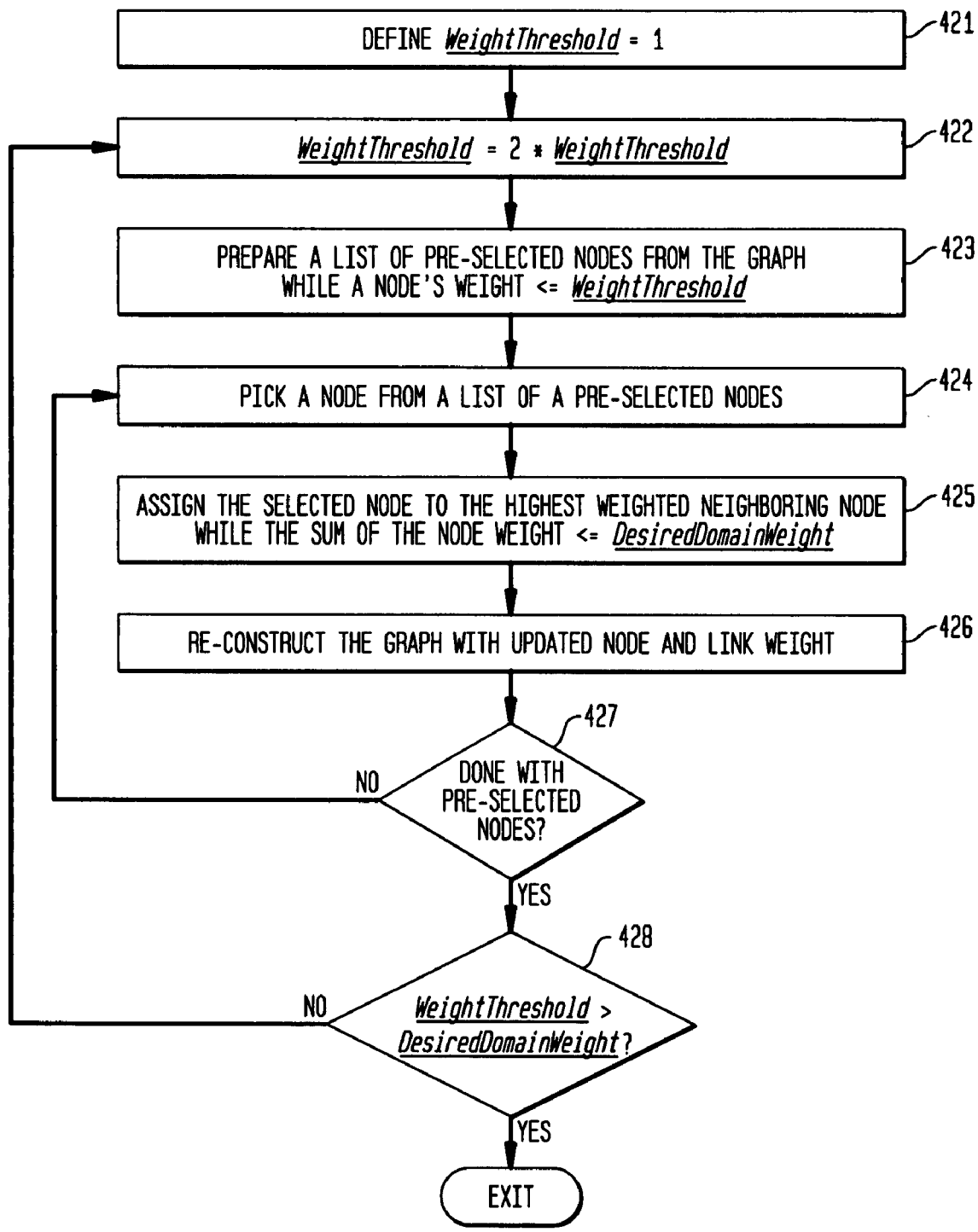

FIG. 5B illustrates a flowchart of an exemplary process for contracting graphs in accordance with step 420 in FIG. 4. In this illustrated exemplary process, a weight threshold is defined as one (1) at step 421. At step 422 the current weight threshold is increases. In this case, the threshold is iteratively doubled in each pass. It would be recognized that this increase may also be performed using other arithmetic methods. At step 423, a list of nodes having node weights less than the current threshold weight is obtained. At step 424 a node is selected from the list of nodes having weights less than the current threshold weight and at block 425 the selected node is added to the highest weighted neighboring node while the accumulated node weight is less than the desired domain weight. At block 426 the graph is reconstructed with the updated node and weights. At block 427 a determination is made whether all the nodes have weights less than the current weight threshold have been processed. If the answer is negative, then a next node is selected at block 424. Otherwise, a determination is made at block 428 whether the current weight threshold is greater than the desired domain weight. If the answer is negative, then processing continues to step 422 where the current weight threshold is increased.

Figure 5C:
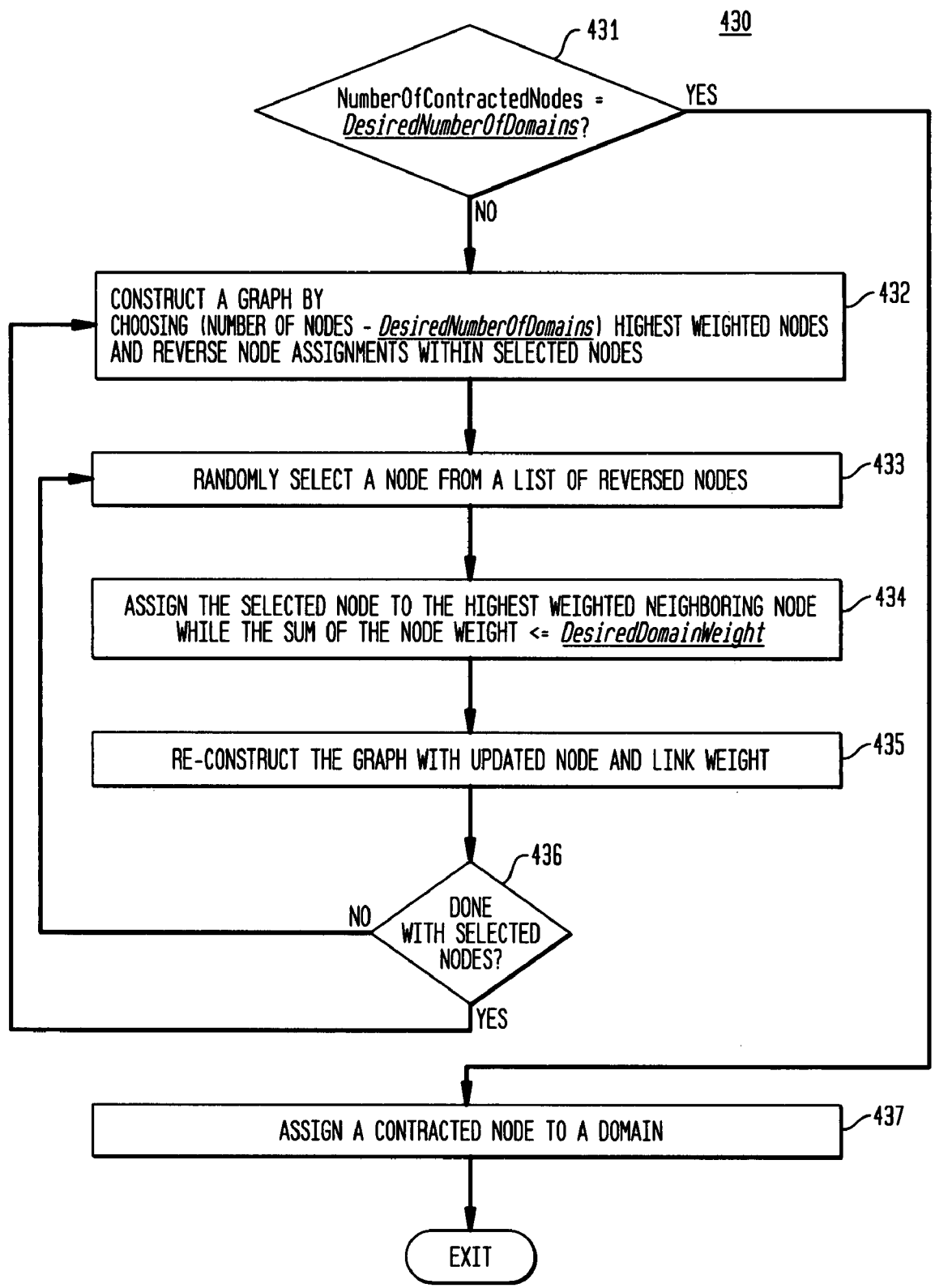

FIG. 5C illustrates a flowchart of an exemplary process for examining the results of a graph contraction in accordance with step 430 of FIG. 4. In this illustrated exemplary process, a determination is made at step 431 whether the number of contracted nodes (super nodes) is equal to the desired number of domains. If the answer is in the affirmative, then a contracted node is assigned to one of the desired domains. Otherwise the algorithm will generate a list of nodes from the number of contracted nodes minus the number of desired domains.

The merging decisions previously made are then reversed at step 432. At step 433 a node is selected from the list of reversed nodes and the selected node is assigned to the highest weighted neighboring node which satisfies the condition that the resulting weight caused by the addition of the selected node to the highest weighted neighboring node remains no greater than the desired domain weight. At block 435 the graph is reconstructed including the recently contracted node. At step 436 a determination is made whether all the nodes have been processed. If the answer is negative, then a next node is selected. Otherwise, a new graph is constructed.

Figure 5D:
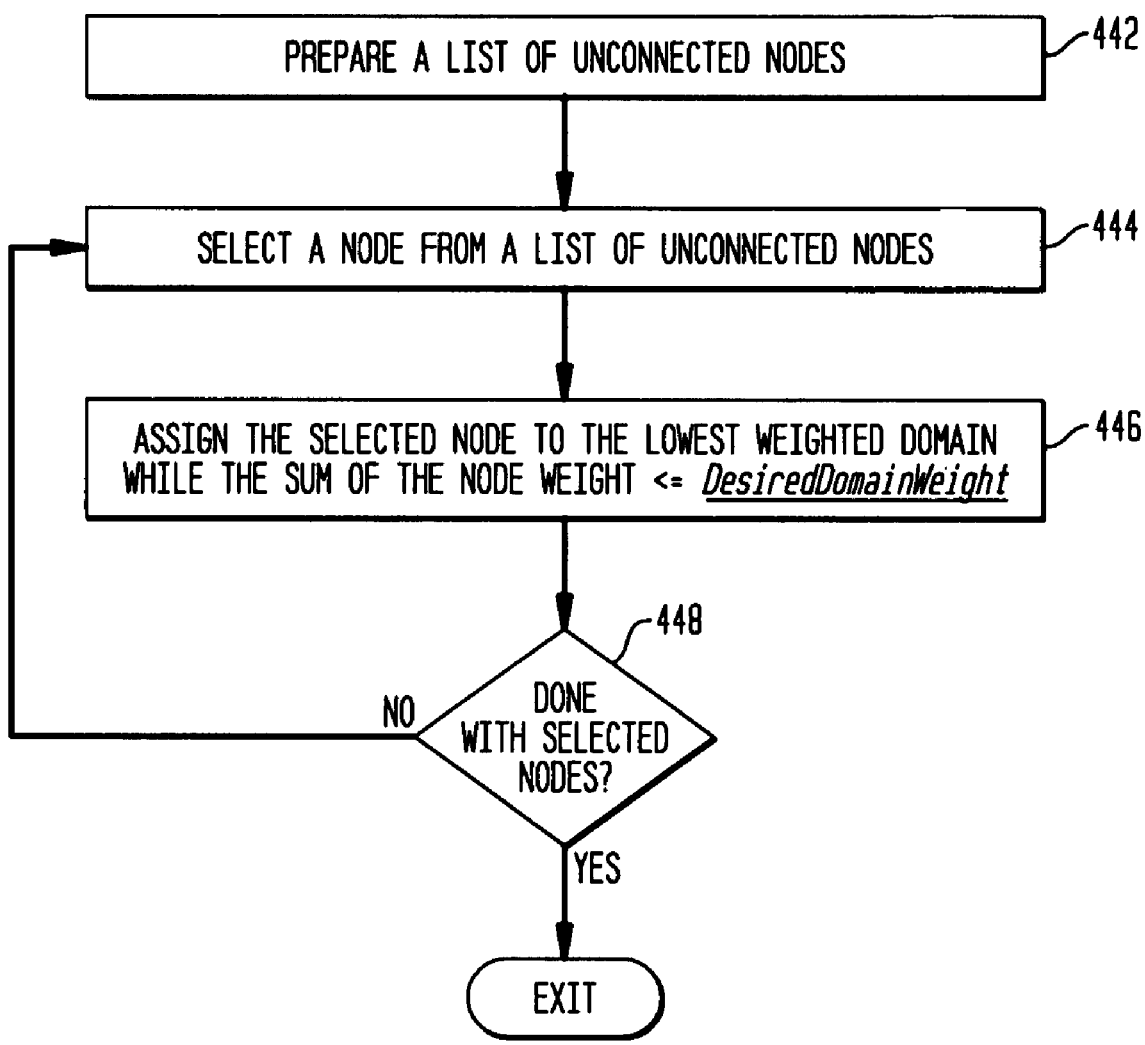

FIG. 5D illustrates a flowchart of an exemplary process for assigning singleton nodes (i.e., nodes that are not attached to the network or their attachment to the network is unknown) in accordance with step 440 of FIG. 4. In this illustrated exemplary process, a list of unattached or unconnected nodes is prepared at step 442. At step 444, a node is selected from the list of unconnected nodes. At step 446, the selected node is assigned to the lowest weighted domain if the sum of the node weight is no greater than the desired domain weight. At step 448, a determination is made whether all the nodes have been processed. If the answer is negative, processing continues to step 444 to select a next node.

Figure 5E:
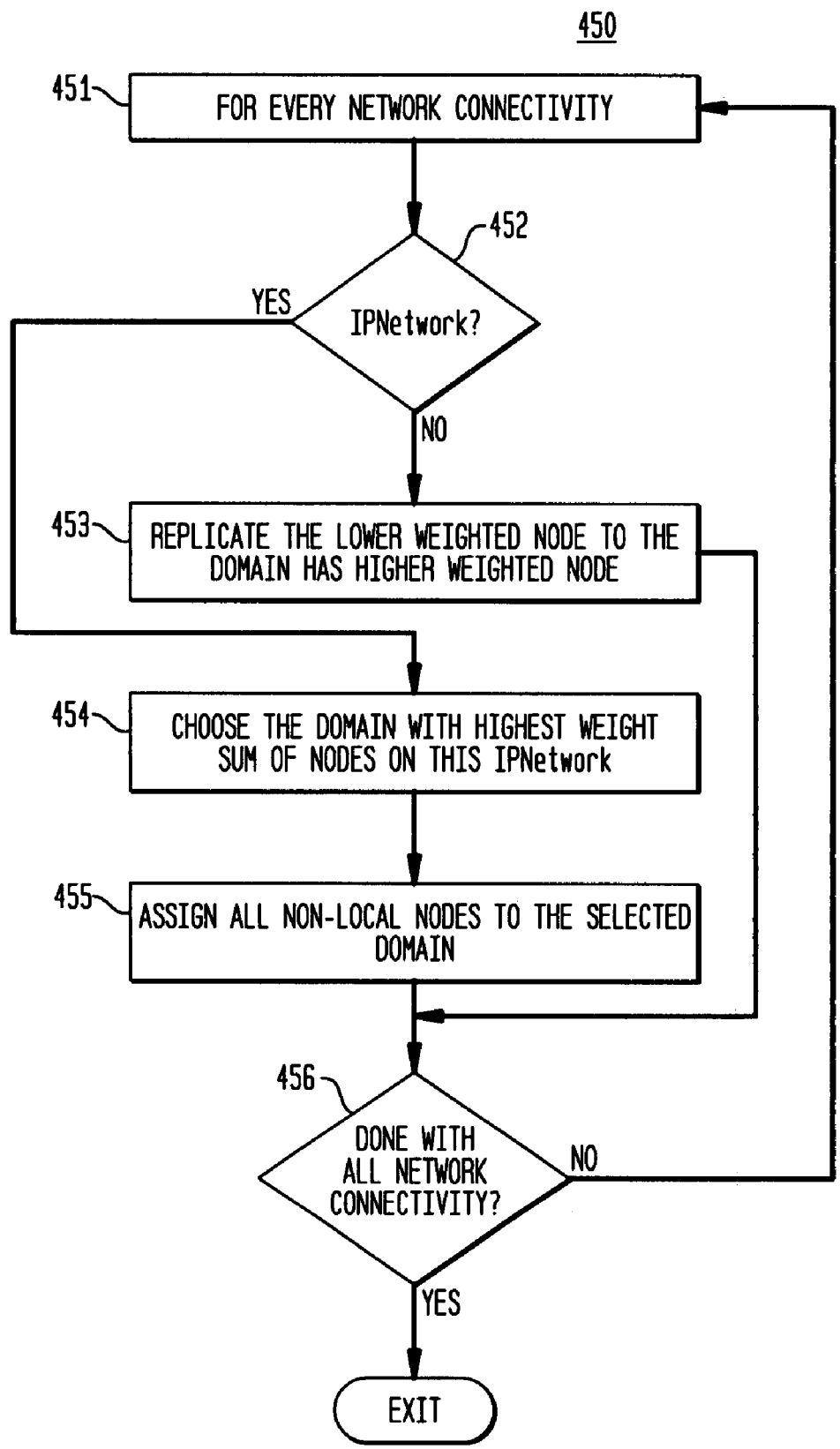

FIG. 5E illustrates a flowchart of an exemplary process for identifying overlapping nodes between (among) domains in accordance with step 450 of FIG. 4. In this illustrated exemplary process, each network connection is examined at step 451 by selecting a network connection and determining whether the network connection is an IP network connection, at step 452. If the answer is negative, then at step 453 a point-to-point connection, i.e., a connection that connects only two devices, is being evaluated and the connected two nodes are assigned to different domains. The node with the lower weight of the two nodes is identified as the overlapping node and is replicated in the domain that contains the node with the higher weight.

Otherwise, the highest weighted sum of nodes is selected at step 454 and all non-local nodes to the selected node are assigned to the selected node at step 455.

At step 456, a determination is made whether processing of all network connections has been performed. If the answer is negative, then processing continues to step 451 for processing a next connection.

Figure 5F:
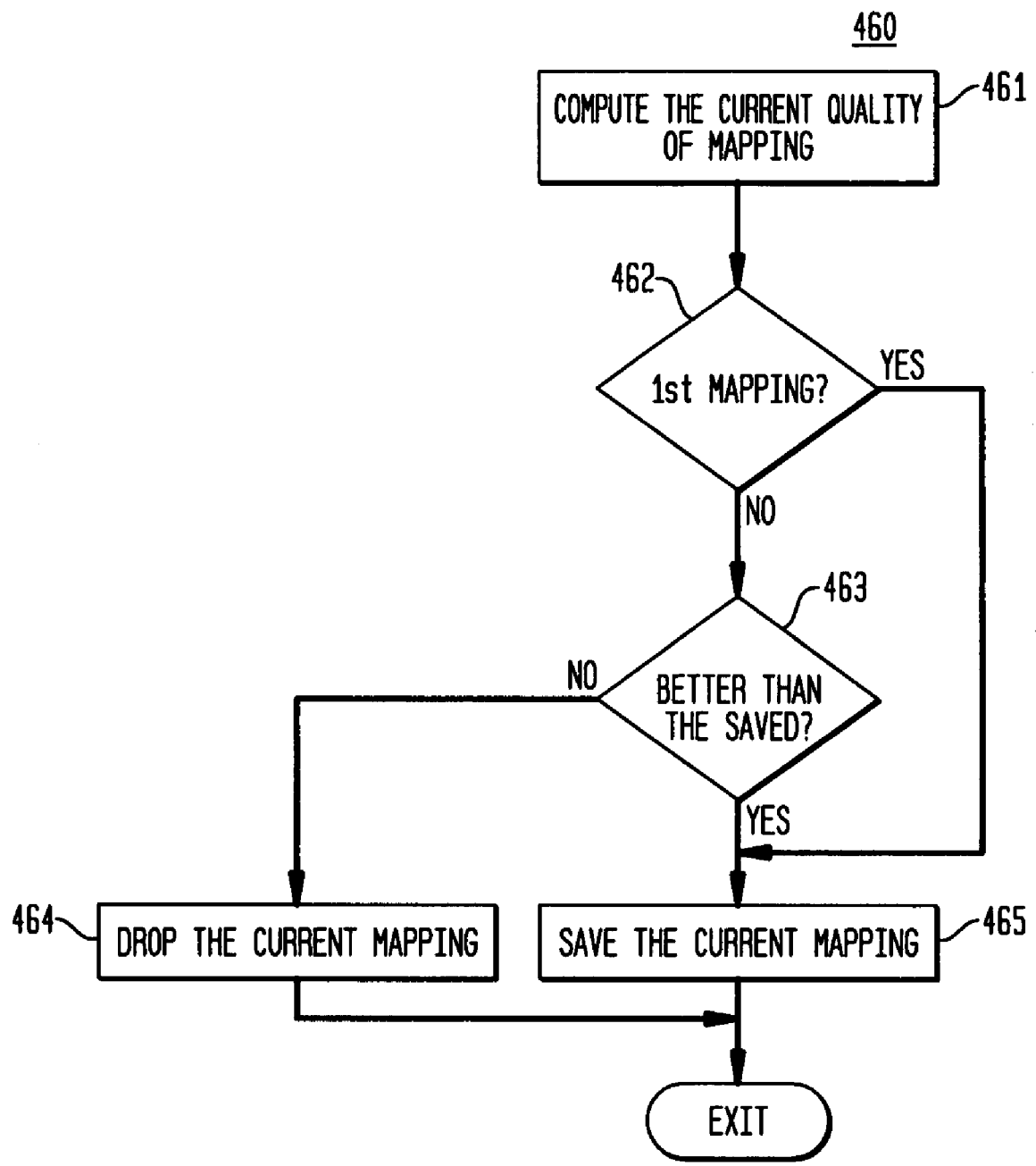

FIG. 5F illustrates a flow chart of an exemplary process for saving the best mapping of split network topology in accordance with step 460 of FIG. 4. In this illustrated process, a quality of a current mapping is determined at step 4651. At step 462 a determination is made whether this is the first mapping. If the answer is in the affirmative, then the mapping is saved at step 465. Otherwise, a determination is made whether the current mapping has a higher quality than a previously saved mapping. If the answer is negative, then the current mapping is dropped from further processing at step 464. Otherwise, the current mapping is saved at step 465.

Domain configuration quality may be determined for example, as:

$$\text{Min}(|D_{max}| - |D_{avg}|)^2 + (|D_{avg}| - |D_{min}|)^2$$

where $D_{max}$ is the max. weight of the domains;

$D_{min}$ is the min. weight of the domains;

$D_{avg}$ is the average weight of the domains; and

|D| is the weight of a domain.

Figure 6A:
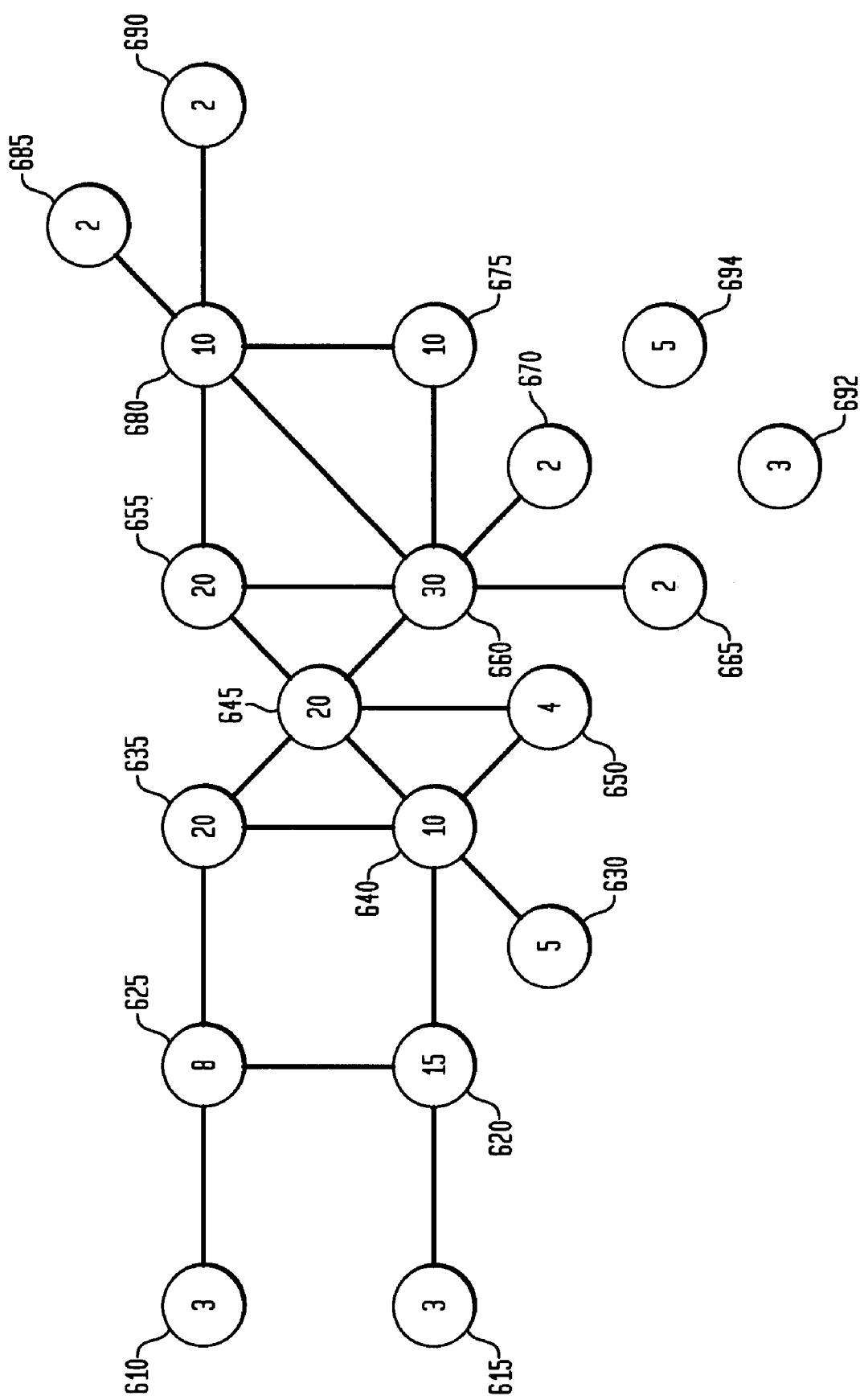
FIGS. 6A-6K illustrate a second example of progressive topology split using graph contraction in accordance with the principles of the invention.

FIGS. 6A-6K collectively illustrate a second example of the topology splitting processing in accordance with the principles of the invention. Referring to FIG. 6A, each of the nodes 610-694 includes a value which represents the weight of the node as previously discussed. Nodes 692 and 694 are two nodes that are included in the network but their connection is undetermined. That is, nodes 692 and 694 represent singleton nodes. Accumulating the weights of each of the nodes, the total network weight is 174. Further, assuming that a desired number of domains into which the topology of the network shown in FIG. 6A is to be split is two (2), the desired domain weight may be determined to be approximately 92.

Figure 6B:
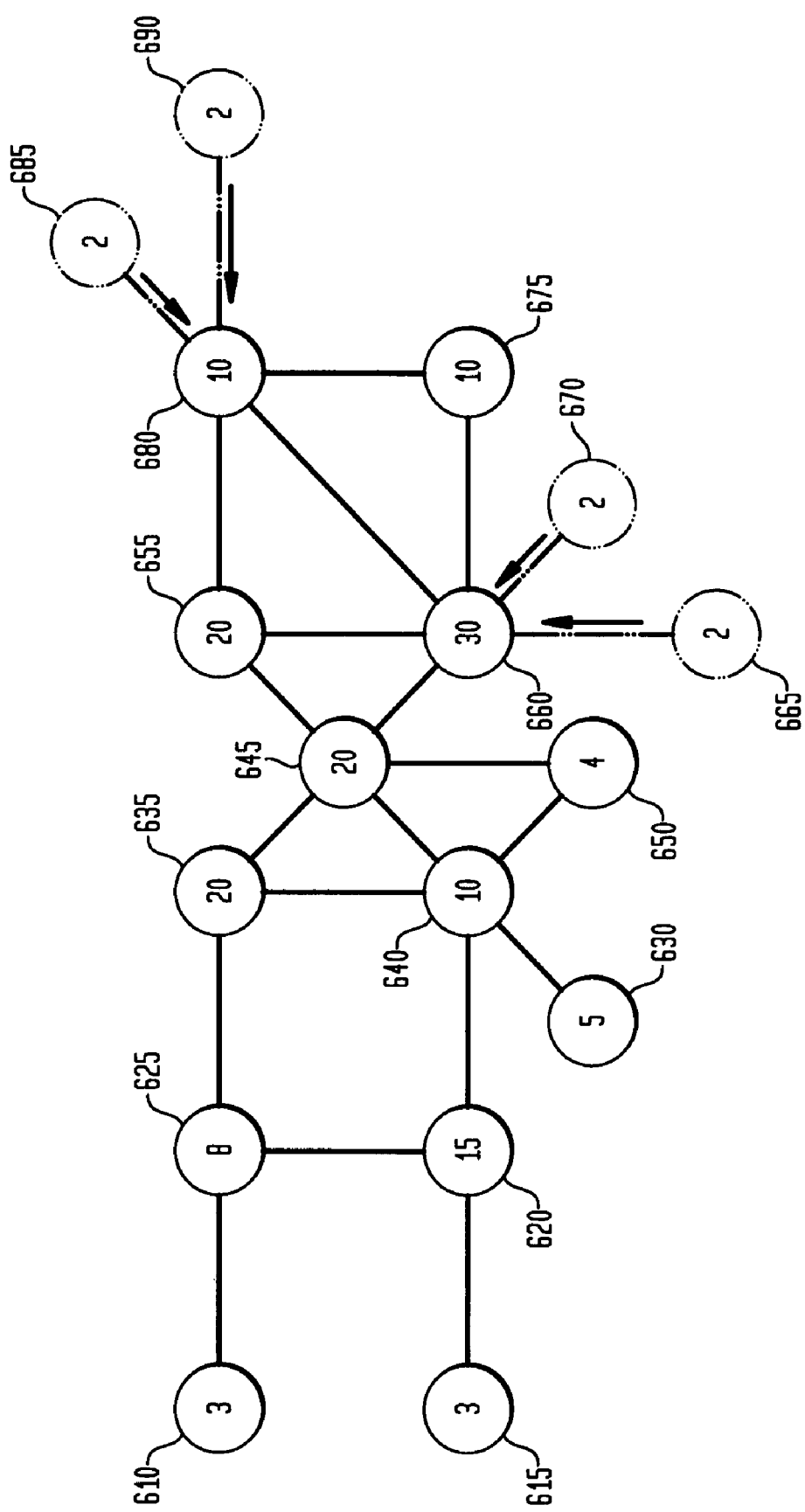
Figure 6C:
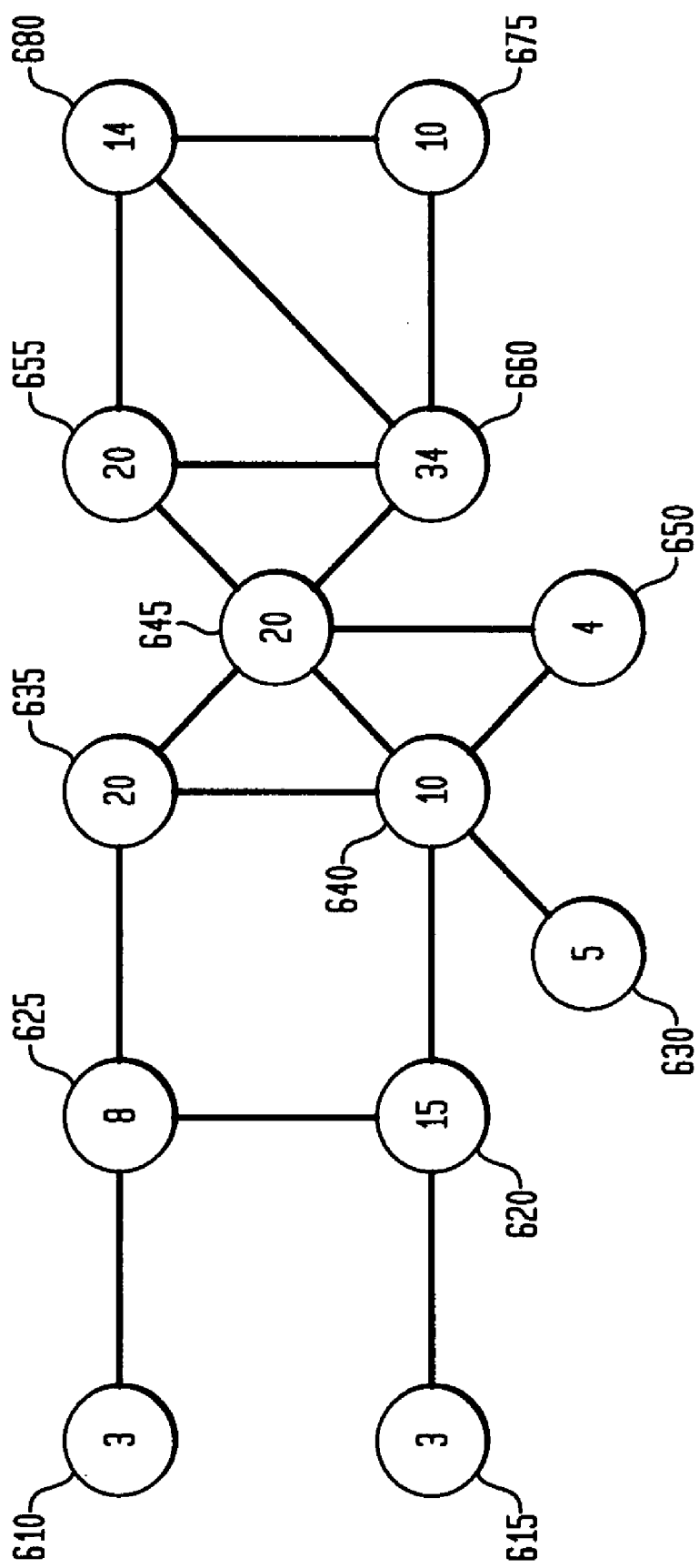

Utilizing the processing shown in FIG. 5B, a weight threshold of two (2) is first established and those nodes having weights no greater than two may be contracted into adjacent nodes. FIG. 6B illustrates the step of contraction and FIG. 6C illustrates the results of the contraction.

Figure 6D:
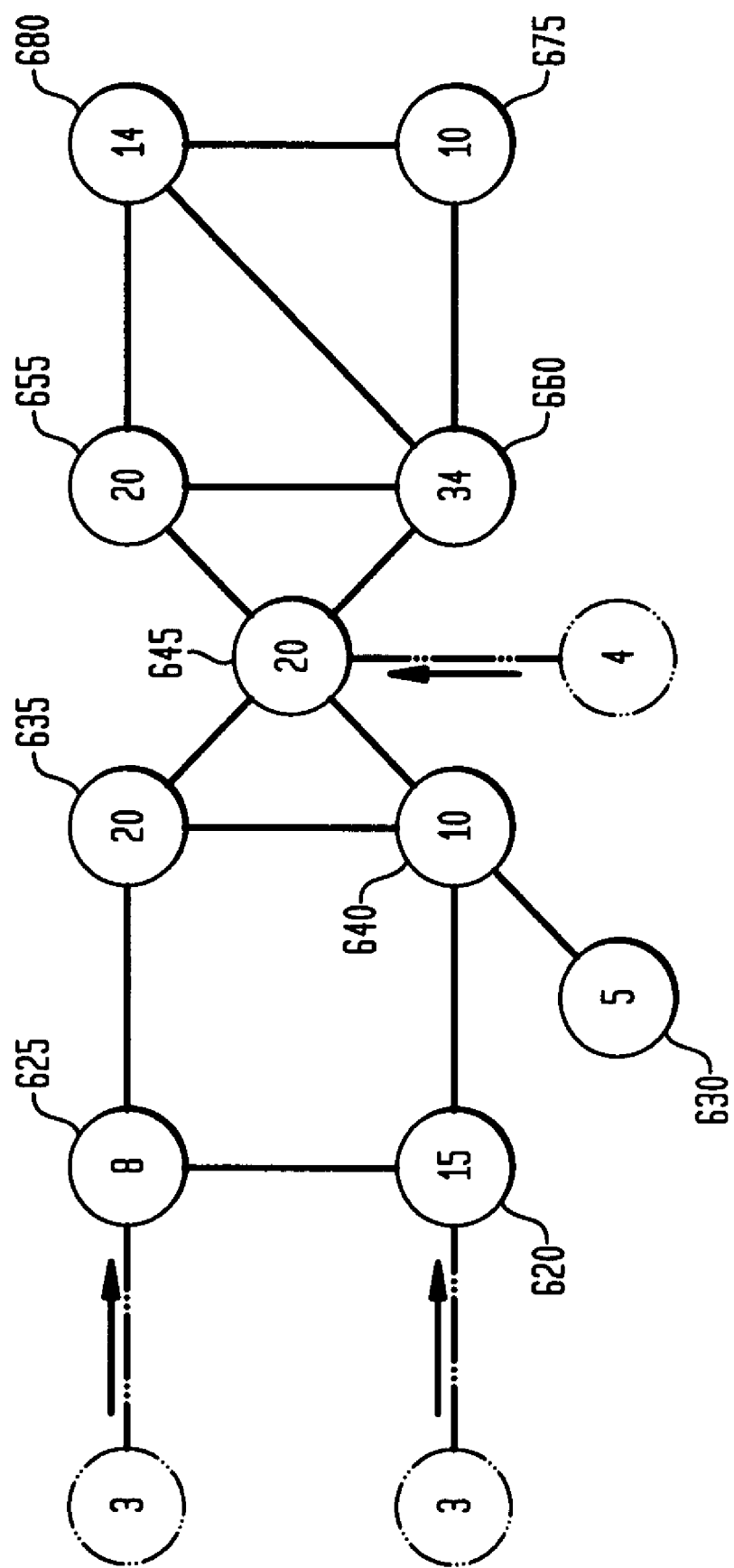
Figure 6E:
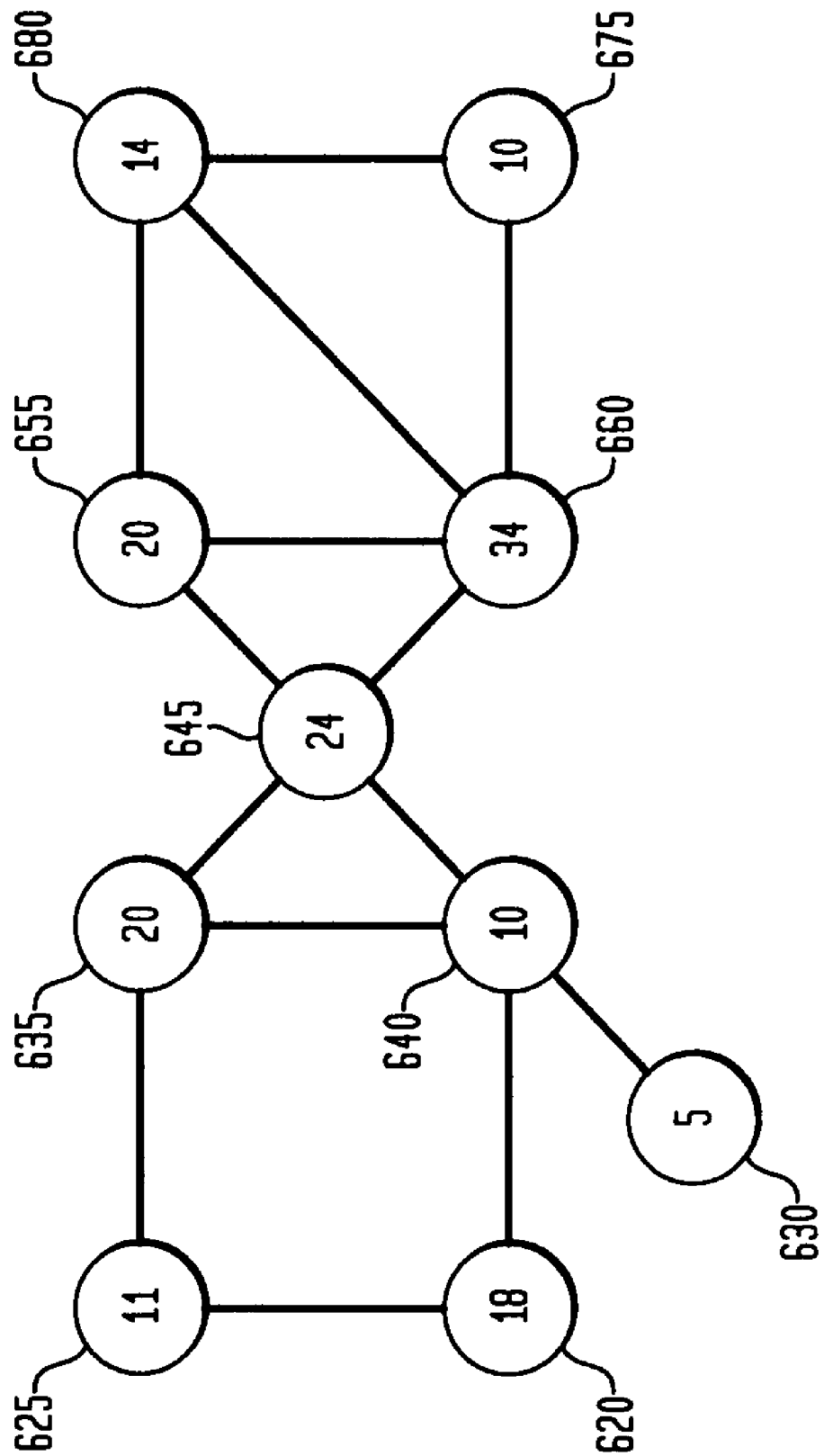

Repeating the processing shown in FIG. 5B, the weight threshold is increased to a value of four (4) and nodes having a weight no greater than 4 are contracted into (i.e., assigned to) adjacent nodes. FIG. 6D illustrates which of the nodes are selected as candidates for contraction and FIG. 6E illustrates the results of the contraction.

Figure 6F:
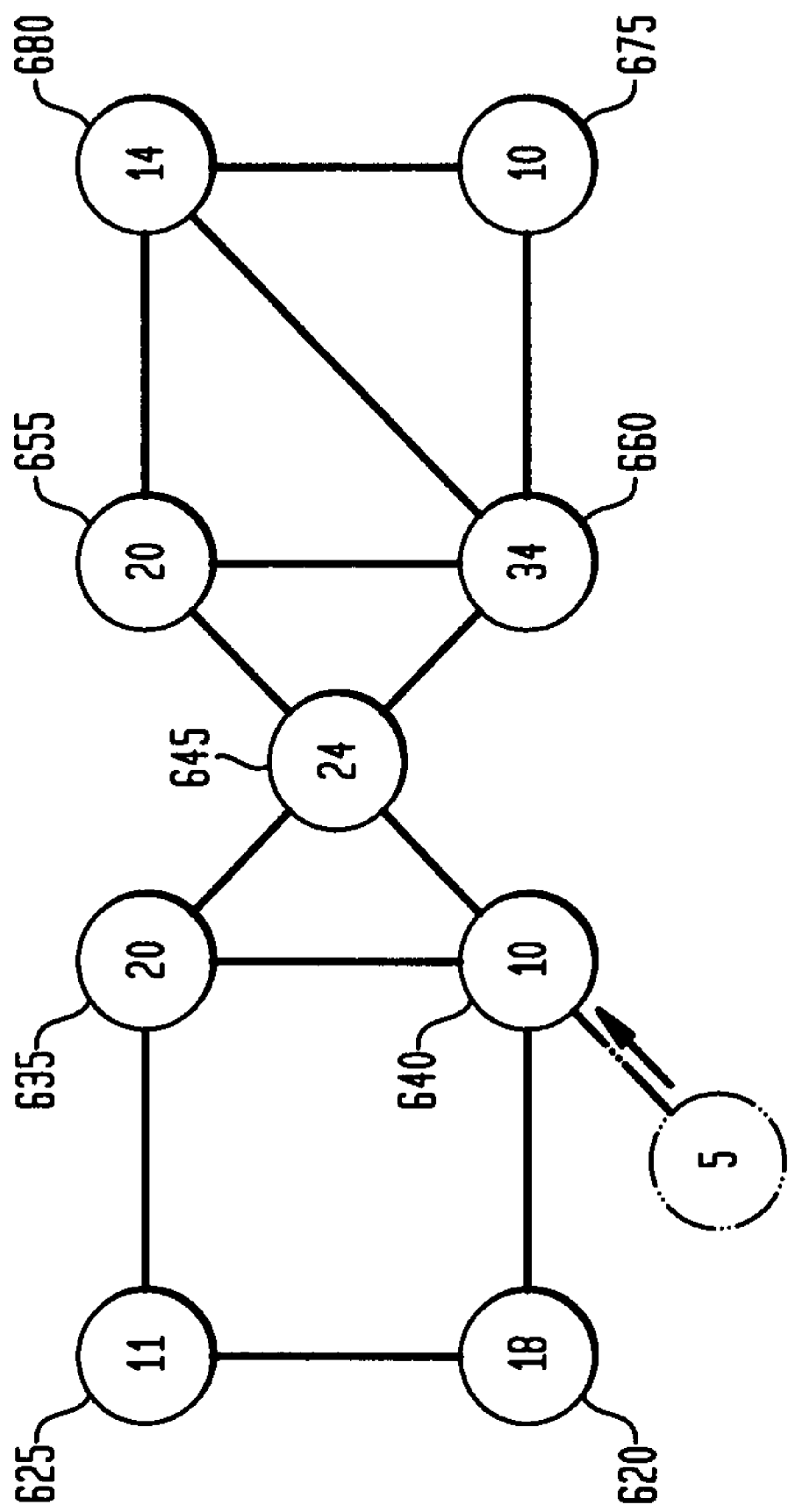
Figure 6G:
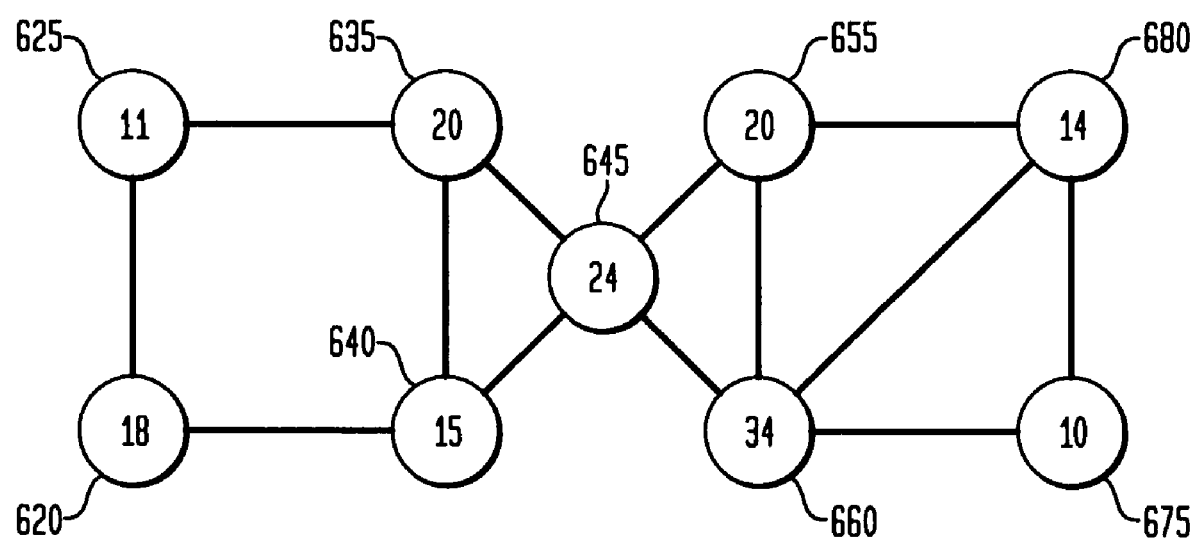
Figure 6H:
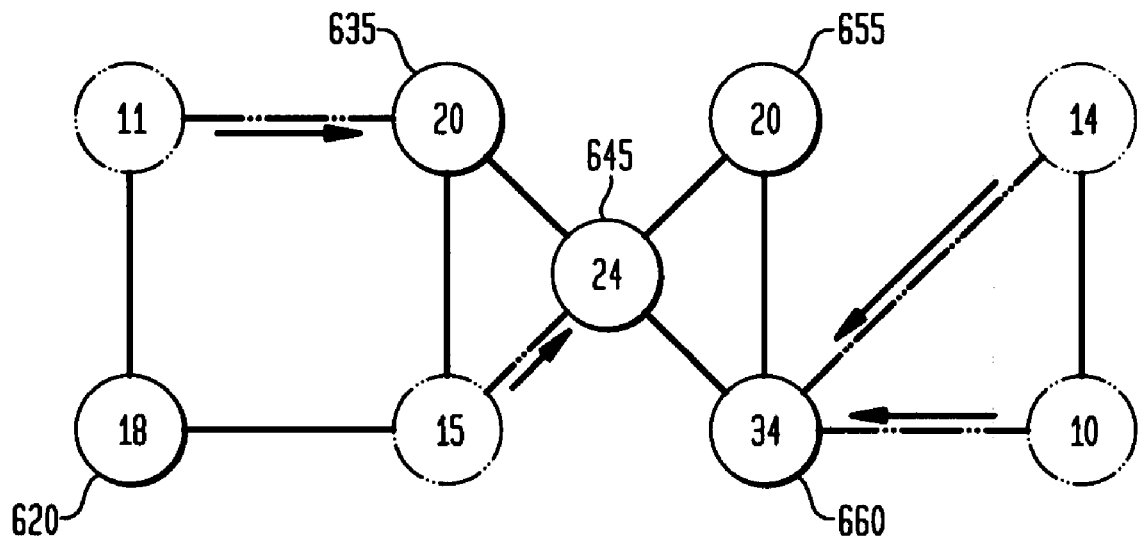
Figure 6I:
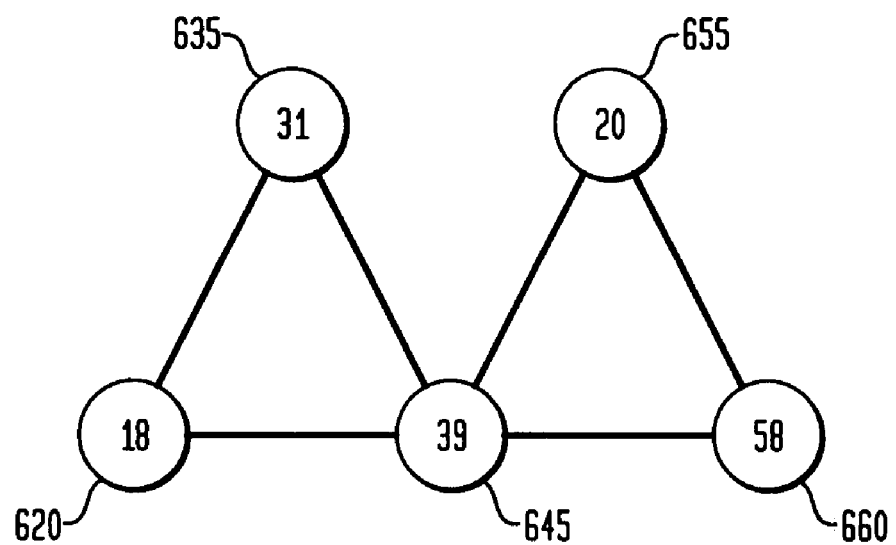
Figure 6J:
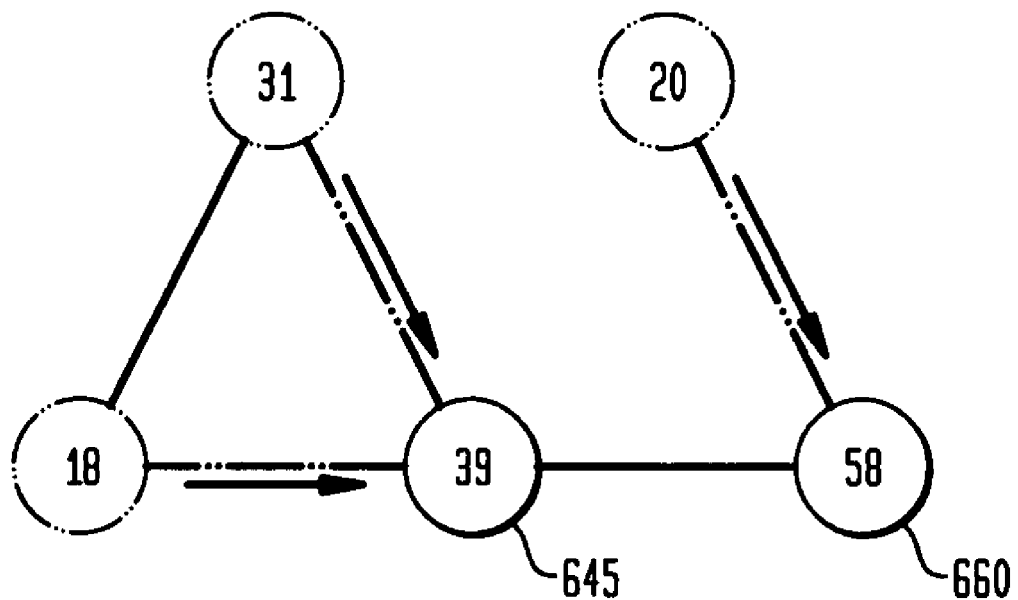
Figure 6K:
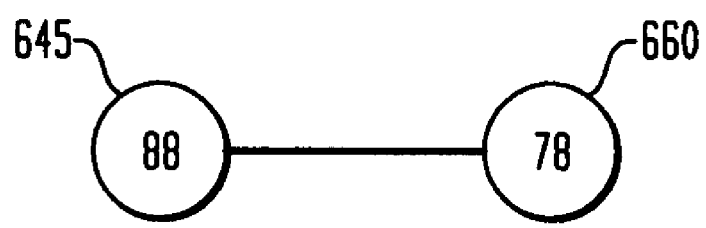

FIGS. 6F and 6G illustrate the contraction process and the results of the contraction when the weight threshold is again increased. In this case, the threshold is set to a value of 8. FIGS. 6H and 6I illustrate the contraction process and the results of the contraction when the weight threshold is increased to a value of 16. And FIGS. 6J and 6K illustrate the contraction or assignment process and the results of the contraction when the weight threshold is increased to a value of 32. In this case, the network topology has been contracted into two super-nodes having weight factors of 88 and 78, respectively.

In this case, the resultant two-super-nodes satisfies one desired criterion in that the number desired domains is equal to two and the total domain weight is no greater than the determined value of 92.

FIGS. 7A and 7B illustrates an exemplary process for assigning singlet node in accordance with step 420 of FIG. 4. In this illustrated example, the nodes 694 and 695 are assigned to super-node or domain having a weight of 78. FIG. 7B illustrates the result of the concatenation of the unassigned nodes to domain weights. In this illustrated case, the domain weights still remain below the desired domain weight.

FIG. 8 illustrates an each of the nodes associated with the determined domains or super-nodes. In this illustrated example, the nodes associated with each of the domains is illustrated to determine which of the nodes have communication lines between (among) the domains. In this case, node 645, 655 and 660 provide communication between the nodes of their respective nodes e.

FIG. 9 illustrates a resultant mapping of nodes to domains including the determined overlapping node 450 that is than saved as mapping satisfying the desired criterion.

Although the development of a single mapping of the network shown in FIG. 6A has been shown, it would be recognized that the processing shown in FIG. 4 may be repeated for utilizing different criteria that would result in domain configurations including different node elements with different weighting factors. From the teachings provided herein, one skilled in the art would be able to practice the invention described herein to obtain different domain configurations with undue experimentation and, thus, the iterative process shown is not disclosed in further detail.

As would be recognized embodiments of the present application disclosed herein include software programs to implement the embodiment and operations disclosed herein. For example, a computer program product including a computer-readable medium encoded with computer program logic (software in a preferred embodiment). The logic is configured to allow a computer system to execute the functionality described above. One skilled in the art will recognize that the functionality described may also be loaded into conventional computer memory and executed by a conventional CPU. The implementations of this invention may take the form, at least partially, of program code (i.e., instructions) embodied in tangible media, such as floppy diskettes, CD-ROMs, hard drives, random access or read only-memory, or any other machine-readable storage medium or downloaded from one or more network connections. When the program code is loaded into and executed by a machine, such as a computer, the machine becomes an apparatus for practicing the invention. The implementations of the present invention may also be embodied in the form of program code that is transmitted over some transmission medium, such as over electrical wiring or cabling, through fiber optics, or via any other form of transmission. This may be implemented so that when the program code is received and loaded into and executed by a machine, such as a computer, the machine becomes an apparatus for practicing the invention. When executed in a computer's memory by a processing unit, the functionality or processes described herein reconfigures a general purpose digital computer into a special purpose digital computer enabled for implementing the functionality discussed herein. When implemented on a general-purpose processor, the program code combines with the processor of the computer to provide a unique apparatus that operates analogously to specific logic circuits.

One more particular embodiment of the present application is directed to a computer program product that includes a computer readable medium having instructions stored thereon for supporting management and viewing of configurations associated with a storage area network. The instructions, when carried out by a processor of a respective computer device, cause the processor to facilitate application deployment configuration.

FIG. 10 illustrates an exemplary embodiment of a system 1000 that may be used for implementing the principles of the present invention. System 1000 may contain one or more input/output devices 1002, processors 1003 and memories 1004. I/O devices 1002 may access or receive information from one or more devices 1001, which represent sources of information. Sources or devices 1001 may be devices such as routers, servers, computers, notebook computer, PDAs, cells phones or other devices suitable for transmitting and receiving information responsive to the processes shown herein. Devices 1001 may have access over one or more network connections 1050 via, for example, a wireless wide area network, a wireless metropolitan area network, a wireless local area network, a terrestrial broadcast system (Radio, TV), a satellite network, a cell phone or a wireless telephone network, or similar wired networks, such as POTS, INTERNET, LAN, WAN and/or private networks, e.g., INTRANET, as well as portions or combinations of these and other types of networks.

Input/output devices 1002, processors 1003 and memories 1004 may communicate over a communication medium 1025. Communication medium 1025 may represent, for example, a bus, a communication network, one or more internal connections of a circuit, circuit card or other apparatus, as well as portions and combinations of these and other communication media. Input data from the sources or client devices 1001 is processed in accordance with one or more programs that may be stored in memories 1004 and executed by processors 1003. Memories 1004 may be any magnetic, optical or semiconductor medium that is loadable and retains information either permanently, e.g. PROM, or non-permanently, e.g., RAM. Processors 1003 may be any means, such as general purpose or special purpose computing system, such as a laptop computer, desktop computer, a server, handheld computer (e.g., Pentium processor, Pentium is a registered Trademark of Intel Corporation), or may be a hardware configuration, such as dedicated logic circuit, or integrated circuit. Processors 1003 may also be Programmable Array Logic (PAL), or Application Specific Integrated Circuit (ASIC), etc., which may be "programmed" to include software instructions or code that provides a known output in response to known inputs. In one aspect, hardware circuitry may be used in place of, or in combination with, software instructions to implement the invention. The elements illustrated herein may also be implemented as discrete hardware elements that are operable to perform the operations shown using coded logical operations or by executing hardware executable code.

In one aspect, the processes shown herein may be represented by computer readable code stored on a computer readable medium. The code may also be stored in the memory 1004. The code may be read or downloaded from a memory medium 1083, an I/O device 1085 or magnetic or optical media, such as a floppy disk, a CD-ROM or a DVD, 1087 and then stored in memory 1004. Similarly the code may be downloaded over one or more networks, e.g., 1050, 1080, or not shown via I/O device 1085, for example, for execution by processor 1003 or stored in memory 1004 and then accessed by processor 1003. As would be appreciated, the code may be processor-dependent or processor-independent. JAVA is an example of processor-independent code. JAVA is a trademark of the Sun Microsystems, Inc., Santa Clara, Calif. USA.

Information from device 01 received by I/O device 1002, after processing in accordance with one or more software programs operable to perform the functions illustrated herein, may also be transmitted over network 80 to one or more output devices represented as display 1092, reporting device 1090 or second processing system 1095.

As one skilled in the art would recognize, the term computer or computer system may represent one or more processing units in communication with one or more memory units and other devices, e.g., peripherals, connected electronically to and communicating with the at least one processing unit. Furthermore, the devices may be electronically connected to the one or more processing units via internal busses, e.g., ISA bus, microchannel bus, PCI bus, PCMCIA bus, etc., or one or more internal connections of a circuit, circuit card or other device, as well as portions and combinations of these and other communication media or an external network, e.g., the Internet and Intranet.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method, operable in a computer system, for assigning elements of a network into a plurality of domains, said method comprising the steps of:
   determining a weight for each of said network elements by one or more computers;
   creating at least one of said plurality of domains by assigning each of said network elements having a weight no greater than a desired weight threshold with a highest weighted neighboring network element wherein the weight of said network elements and the highest weight neighboring network element is no greater than a desired threshold value, wherein the weight is determined based on the number of managed network adapters, number of fault network adapters and number of unmanaged network adapters and an associated link weight; and
   iteratively increasing the desired weight threshold and repeating the assignment of network elements to at least one of said plurality of domains until a desired number of domains having an accumulated weight less than the desired threshold value has been obtained.

2. The method as recited in claim 1, further comprising the step of:
   identifying each of said network elements assigned to said domains providing communications between said domains.

3. The method as recited in claim 1, further comprising the step of:
   determining a quality of said assignment of nodes based on a domain weights; and
   retaining the configuration of domains having the highest quality.

4. The method as recited in claim 3, further comprising the step of:
   outputting said configuration of domains having the highest quality.

5. The method as recited in claim 1, wherein the weight threshold is doubled for each iteration.

6. The method as recited in claim 1 wherein the desired threshold value is determined based on the accumulated weight of each of the nodes and the desired number of domains.

7. The method as recited in claim 1, further comprising the step of:
   obtaining the connection relationships among each of the network elements.

8. The method of claim 1 wherein the performance managed network adapters are adapters that are managed based on defined polices, wherein fault network adapters are adapters that are managed based on predefined policies of a root cause analysis, and further wherein unmanaged network adapters are further network adaptors.

9. The method of claim 8 wherein the link weight is determined as the sum of the connected element's weight.

10. An apparatus for assigning elements of a network into a plurality of domains, said apparatus comprising;
    a processor in communication with a memory, the memory containing instruction therein, which when loaded into said processor causes said processor to execute the steps of
    determining a weight for each of said network elements;
    creating at least one of said plurality of domains by assigning each of said network elements having a weight no greater than a desired weight threshold with a highest weighted neighboring network element wherein the weight of said network elements and the highest weight neighboring network element is no greater than a desired threshold value, wherein the weight is determined based on the number of managed network adapters, number of fault network adapters and number of unmanaged network adapters and an associated link weight; and
    iteratively increasing the desired weight threshold and repeating the assignment of network elements to at least one of said plurality of domains until a desired number of domains having an accumulated weight less than the desired threshold value has been obtained.

11. The apparatus as recited in claim 10, wherein the instruction further causing the processor to execute the step of:

identifying each of said network elements assigned to said domains providing communications between said domains.

12. The apparatus as recited in claim 10, wherein the instruction further causing the processor to execute the step of:
    determining a quality of said assignment of nodes based on a domain weights; and
    retaining the configuration of domains having the highest quality.

13. The apparatus as recited in claim 12, wherein the instruction further causing the processor to execute the step of:
    outputting said configuration of domains having the highest quality.

14. The apparatus as recited in claim 10, wherein the weight threshold is doubled for each iteration.

15. The apparatus as recited in claim 10 wherein the desired threshold value is determined based on the accumulated weight of each of the nodes and the desired number of domains.

16. The apparatus as recited in claim 10, wherein the instruction further causing the processor to execute the step of:
    obtaining the connection relationships among each of the network elements.

17. The apparatus of claim 10 wherein the performance managed network adapters are adapters that are managed based on defined polices, wherein fault network adapters are adapters that are managed based on predefined policies of a root cause analysis, and further wherein unmanaged network adapters are further network adaptors.

18. The apparatus of claim 17 wherein the link weight is determined as the sum of the connected element's weight.

19. A computer-program product comprising a non-transitory computer readable medium storing code for providing said code to a processor system for assigning elements of a network into a plurality of domains, said code which when accessed by said processor system causes the processor to execute the steps of:
    determining a weight for each of said network elements;
    creating at least one of said plurality of domains by assigning each of said network elements having a weight no greater than a desired weight threshold with a highest weighted neighboring network element wherein the weight of said network elements and the highest weight neighboring network element is no greater than a desired threshold value, wherein the weight is determined based on the number of managed network adapters, number of fault network adapters and number of unmanaged network adapters and an associated link weight; and
    iteratively increasing the desired weight threshold and repeating the assignment of network elements to at least one of said plurality of domains until a desired number of domains having an accumulated weight less than the desired threshold value has been obtained.

20. The product as recited in claim 19, wherein the code further causing the processor system to execute the step of:
    identifying each of said network elements assigned to said domains providing communications between said domains.

21. The product as recited in claim 19, wherein the code further causing the processor system to execute the step of:
    determining a quality of said assignment of nodes based on a domain weights; and
    retaining the configuration of domains having the highest quality.

22. The product as recited in claim 21, wherein the code further causing the processor system to execute the step of:
    outputting said configuration of domains having the highest quality.

23. The product as recited in claim 19, wherein the weight threshold is doubled for each iteration.

24. The product as recited in claim 19 wherein the desired threshold value is determined based on the accumulated weight of each of the nodes and the desired number of domains.

25. The product as recited in claim 19, wherein the instruction further causing the processor to execute the step of:
    obtaining the connection relationships among each of the network elements.

26. The computer product of claim 19 wherein the performance managed network adapters are adapters that are managed based on defined polices, wherein fault network adapters are adapters that are managed based on predefined policies of a root cause analysis, and further wherein unmanaged network adapters are further network adaptors.

27. The computer product of claim 26 wherein the link weight is determined as the sum of the connected element's weight.

* * * * *